(12) United States Patent
Kumazawa et al.

(10) Patent No.: US 9,789,671 B2
(45) Date of Patent: Oct. 17, 2017

(54) SHOCK ABSORBING MEMBER

(71) Applicants: Takeshi Kumazawa, Aichi (JP); Kiyoto Sekine, Aichi (JP); Ayumi Tsujino, Aichi (JP)

(72) Inventors: Takeshi Kumazawa, Aichi (JP); Kiyoto Sekine, Aichi (JP); Ayumi Tsujino, Aichi (JP)

(73) Assignee: MINO CERAMIC CO., LTD., Mizunami-shi, Gifu (JP)

( * ) Notice: Subject to any disclaimer, the term of this patent is extended or adjusted under 35 U.S.C. 154(b) by 0 days.

(21) Appl. No.: 14/123,651

(22) PCT Filed: Feb. 27, 2013

(86) PCT No.: PCT/JP2013/055214
§ 371 (c)(1),
(2) Date: Dec. 3, 2013

(87) PCT Pub. No.: WO2013/129513
PCT Pub. Date: Sep. 6, 2013

(65) Prior Publication Data
US 2014/0123844 A1 May 8, 2014

(30) Foreign Application Priority Data

Feb. 28, 2012 (JP) ................... 2012-041111
Jun. 11, 2012 (JP) ................... 2012-132233
Sep. 11, 2012 (JP) ................... 2012-199828

(51) Int. Cl.
*F41H 5/04* (2006.01)
*B32B 15/04* (2006.01)
(Continued)

(52) U.S. Cl.
CPC ............ *B32B 37/06* (2013.01); *C04B 35/563* (2013.01); *C04B 35/645* (2013.01);
(Continued)

(58) Field of Classification Search
CPC ....... F41H 5/0421; B32B 15/04; B32B 15/20; B32B 18/00; C04B 35/563; C04B 37/006
(Continued)

(56) References Cited

U.S. PATENT DOCUMENTS 3,730,827 A 5/1973 Matchen et al.
4,420,352 A 12/1983 Schroeder et al.
(Continued)

FOREIGN PATENT DOCUMENTS

EP 2612844 7/2013
JP 61-077676 4/1986
(Continued)

OTHER PUBLICATIONS

English translation of JP 07/137199; May 1995, 11 pages.
(Continued)

*Primary Examiner* — Joanna Pleszczynska
(74) *Attorney, Agent, or Firm* — Hamre, Schumann, Mueller & Larson, P.C.

(57) ABSTRACT

A shock absorbing member 50 having a ceramic bonded body 15 having: a plurality of first sheet-like members 5 each having a ceramic containing 60 mass % or more of boron carbide and each having a thickness of 0.1 to 50 mm; and a bonding layer arranged between the first sheet-like members 5 adjacent to each other, the bonding layer bonding surfaces to be bonded facing each other of the first sheet-like members adjacent to each other, wherein the bonding layer has a bonding material containing at least one metal selected from the group consisting of aluminum, copper, silver, and gold.

9 Claims, 12 Drawing Sheets

(51) Int. Cl.
  *B32B 15/20* (2006.01)
  *B32B 18/00* (2006.01)
  *B32B 37/06* (2006.01)
  *C04B 35/563* (2006.01)
  *C04B 35/645* (2006.01)
  *C04B 37/00* (2006.01)

(52) U.S. Cl.
  CPC ......... *C04B 37/006* (2013.01); *F41H 5/0421* (2013.01); *C04B 2235/3821* (2013.01); *C04B 2235/3895* (2013.01); *C04B 2235/5445* (2013.01); *C04B 2235/656* (2013.01); *C04B 2235/6567* (2013.01); *C04B 2235/72* (2013.01); *C04B 2235/722* (2013.01); *C04B 2235/77* (2013.01); *C04B 2235/963* (2013.01); *C04B 2237/121* (2013.01); *C04B 2237/124* (2013.01); *C04B 2237/125* (2013.01); *C04B 2237/341* (2013.01); *C04B 2237/343* (2013.01); *C04B 2237/36* (2013.01); *C04B 2237/365* (2013.01); *C04B 2237/592* (2013.01); *C04B 2237/64* (2013.01); *C04B 2237/704* (2013.01); *C04B 2237/708* (2013.01)

(58) Field of Classification Search
  USPC ....... 428/156, 617, 618, 635, 689, 698, 469; 89/36.02
  See application file for complete search history.

(56) References Cited

U.S. PATENT DOCUMENTS

| | | | |
|---|---|---|---|
| 4,824,008 A | | 4/1989 | Luszcz et al. |
| 4,836,084 A | | 6/1989 | Vogelesang et al. |
| 4,884,737 A | | 12/1989 | Newkirk et al. |
| 5,214,235 A | * | 5/1993 | Froeschner ............... 89/36.13 |
| 5,429,879 A | * | 7/1995 | Syn et al. .................. 428/614 |
| 5,451,279 A | | 9/1995 | Kohinata et al. |
| 5,866,245 A | | 2/1999 | Toriyama et al. |
| 6,123,797 A | | 9/2000 | Pyzik et al. |
| 6,489,036 B1 | | 12/2002 | Sherman |
| 8,030,234 B2 | | 10/2011 | Pyzik et al. |
| 8,186,565 B1 | | 5/2012 | Pyzik et al. |
| 2002/0137621 A1 | * | 9/2002 | Kim ................. C03C 14/004 501/95.3 |
| 2005/0249602 A1 | | 11/2005 | Freling et al. |
| 2009/0229453 A1 | * | 9/2009 | Dickson ..................... 89/36.02 |
| 2009/0280708 A1 | | 11/2009 | Marissen et al. |
| 2009/0320676 A1 | * | 12/2009 | Cronin et al. ............. 89/36.05 |
| 2010/0064404 A1 | | 3/2010 | Es Van et al. |
| 2010/0327537 A1 | | 12/2010 | Johnson et al. |
| 2011/0203452 A1 | * | 8/2011 | Kucherov et al. .......... 89/36.02 |
| 2011/0220281 A1 | | 9/2011 | DiPietro |
| 2011/0259184 A1 | * | 10/2011 | Adams ................. B22D 19/02 89/36.02 |
| 2013/0157835 A1 | | 6/2013 | Sekine et al. |

FOREIGN PATENT DOCUMENTS

| | | |
|---|---|---|
| JP | 62-128975 | 6/1987 |
| JP | 62-207773 | 9/1987 |
| JP | 62-210397 | 9/1987 |
| JP | 4-319435 | 11/1992 |
| JP | 5-106999 | 4/1993 |
| JP | 6-115009 | 4/1994 |
| JP | 7-137199 | 5/1995 |
| JP | 8-206875 | 8/1996 |
| JP | 9-142948 | 6/1997 |
| JP | 9-169571 | 6/1997 |
| JP | 2001-261457 | 9/2001 |
| JP | 2003-225585 | 8/2003 |
| JP | 2008-504142 | 2/2008 |
| JP | 2008-184352 | 8/2008 |
| JP | 2008-275208 | 11/2008 |
| JP | 2009-215091 | 9/2009 |
| JP | 2009-534233 | 9/2009 |
| JP | 2010-513836 | 4/2010 |
| JP | 2010-210217 | 9/2010 |
| JP | 2012-072044 | 4/2012 |
| WO | 97/00734 | 1/1997 |

OTHER PUBLICATIONS

English translation of JP 2010/210217, Sep. 2010, 14 pages.
English translation of JP 2008/275208, Nov. 2008, 18 pages.
English translation of JP 2001-261457; Sep. 2001.
English translation of JP 09-142948; Jun. 1997.
English translation of JP 2537597 (JP Laid-Open 62-128975); Sep. 1996.
Extended European Search Report, issued in the corresponding European patent application No. 13755580.1, dated Nov. 11, 2015, 6 pages.

* cited by examiner

[Figure 1A]
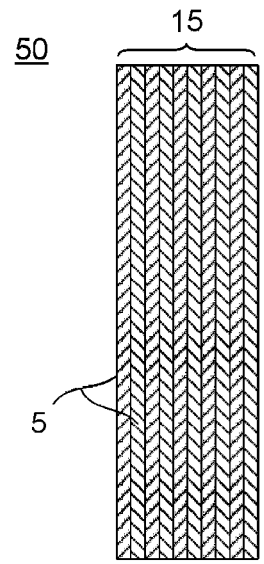
[Figure 1B]
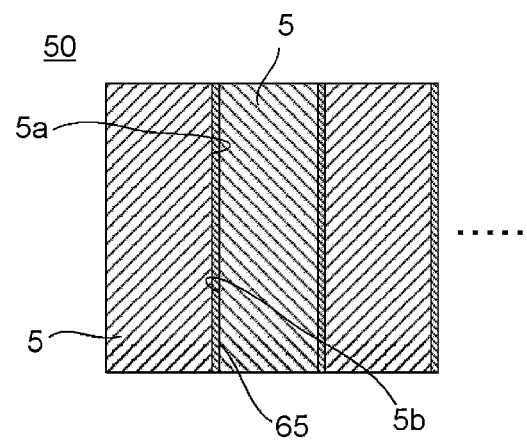

[Figure 2]
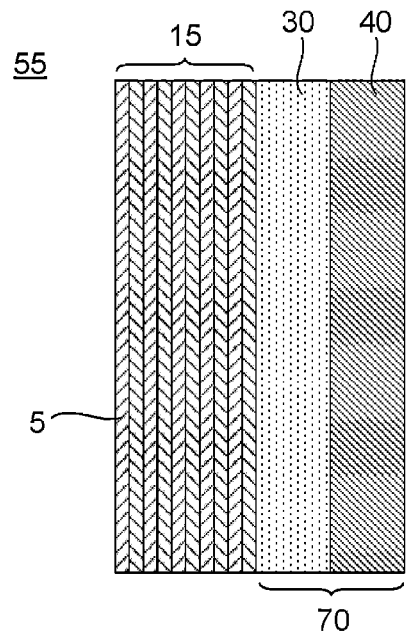
[Figure 3]
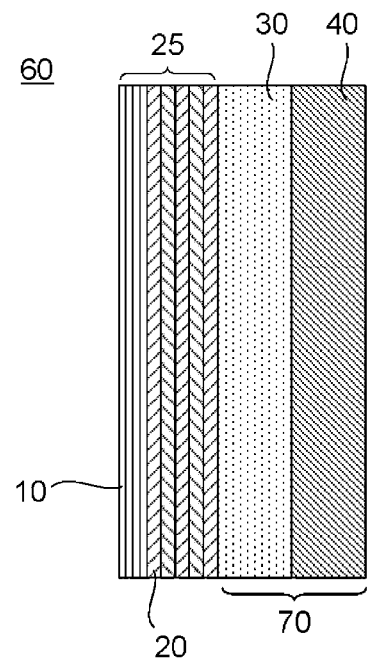

[Figure 4]
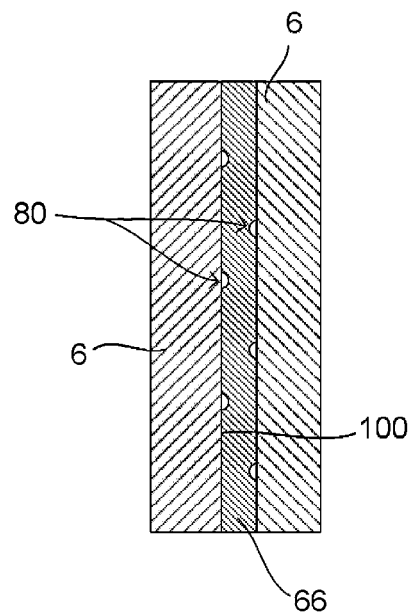
[Figure 5]
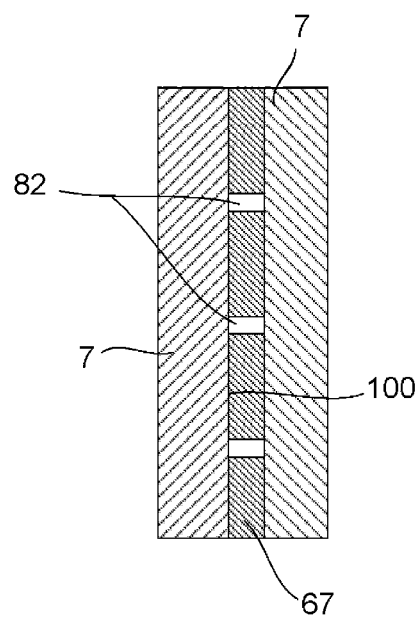

[Figure 6]
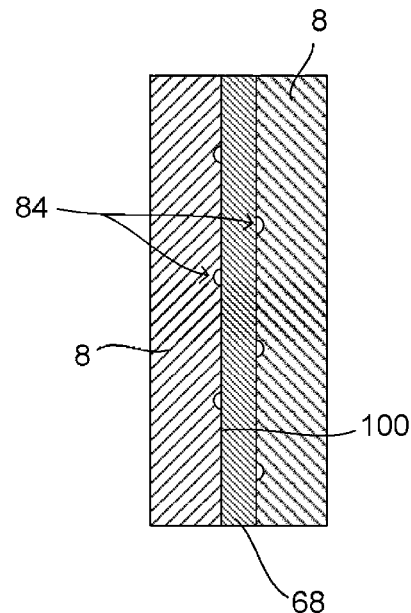
[Figure 7]
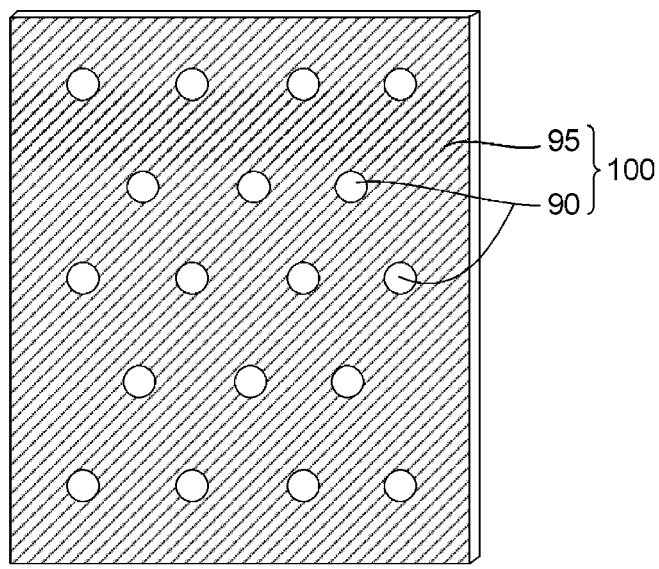

[Figure 8]
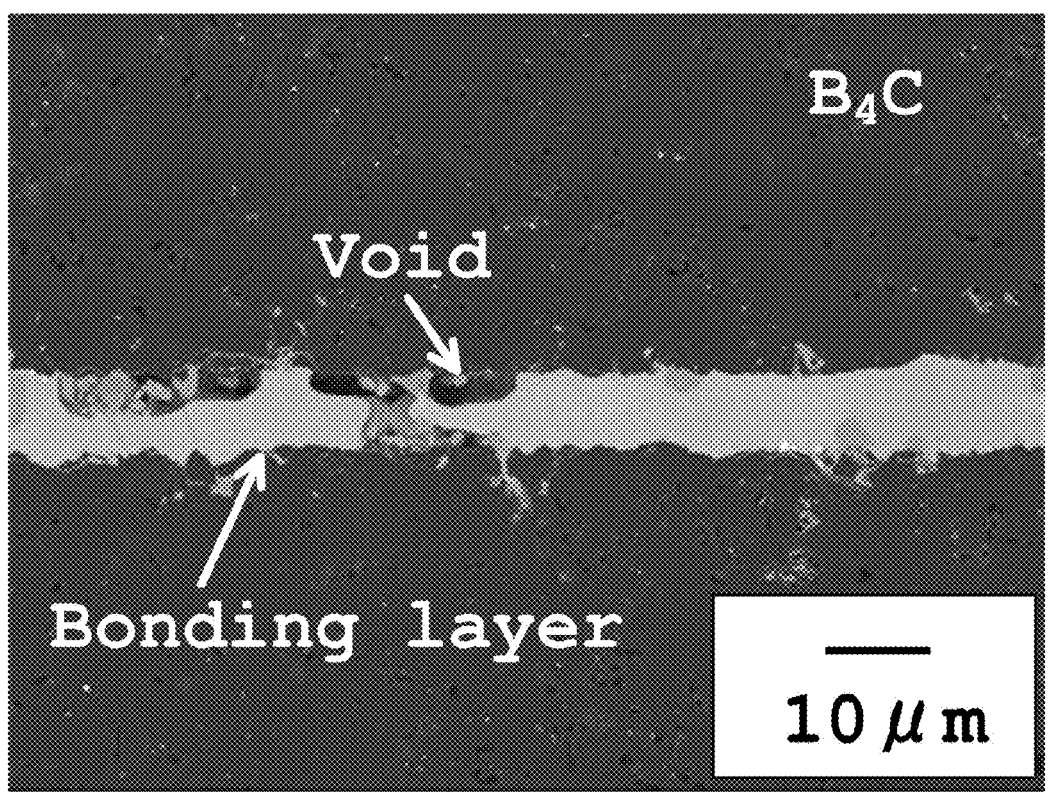

[Figure 9]
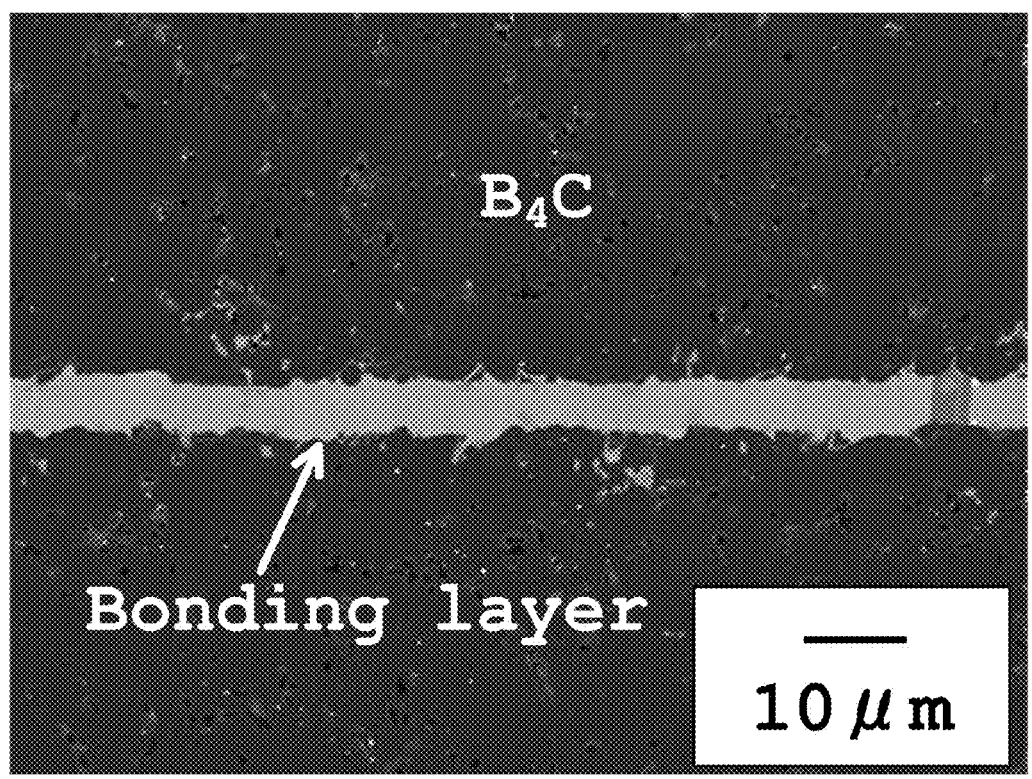

[Figure 10]
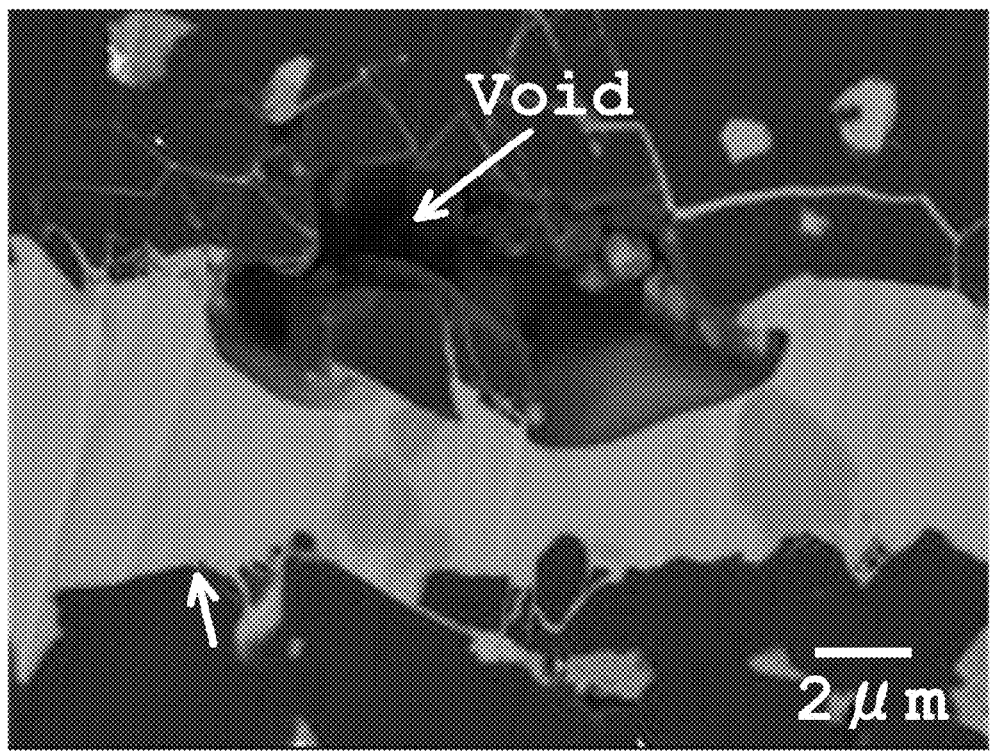

[Figure 11]
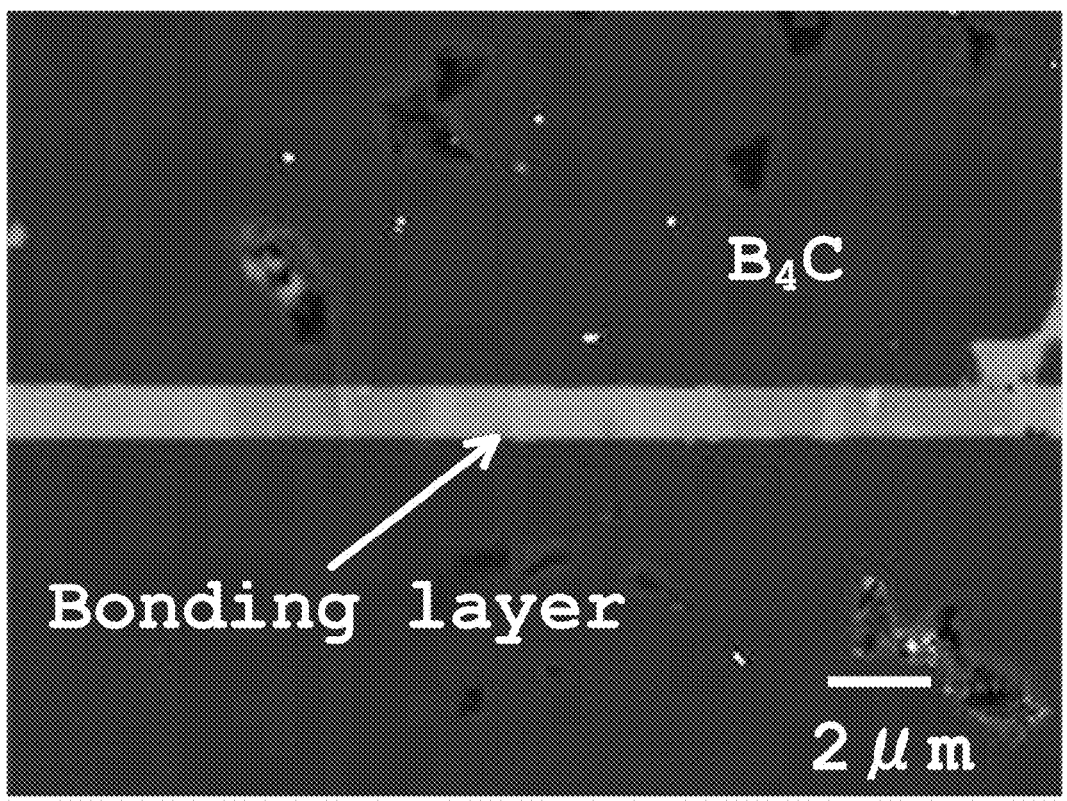

[Figure 12A]
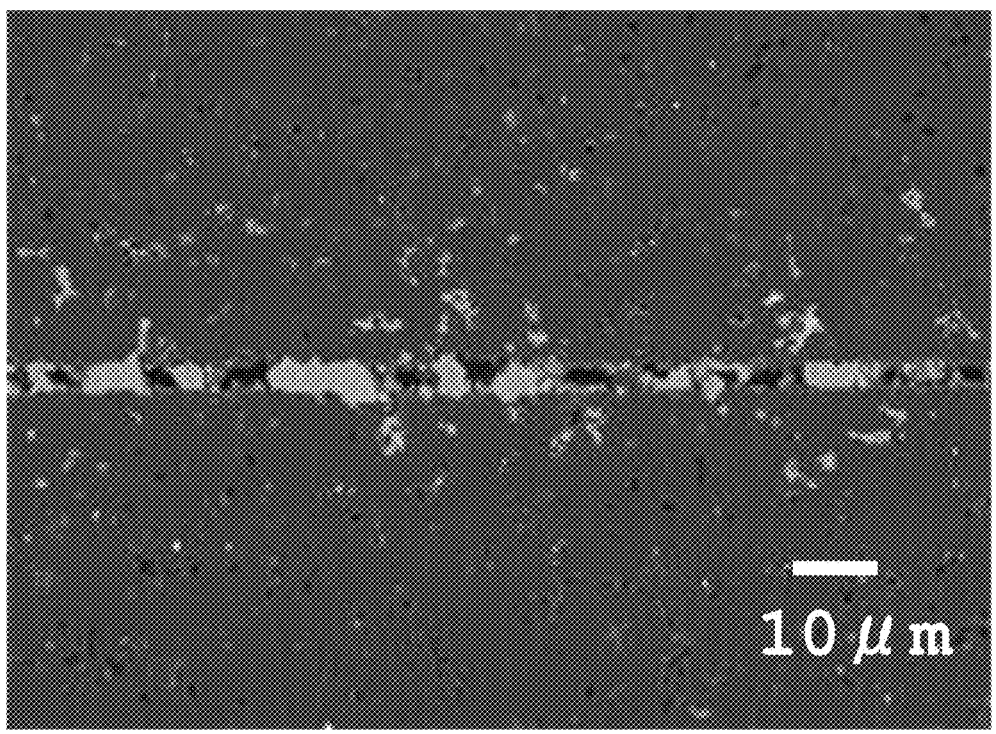

[Figure 12B]
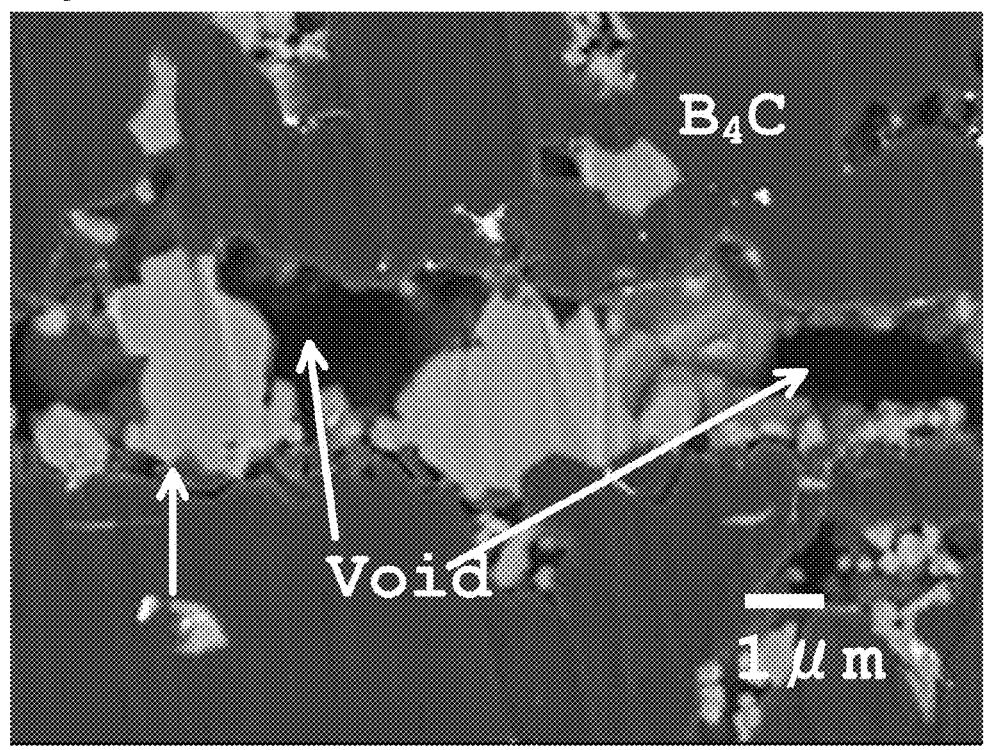

[Figure 13A]
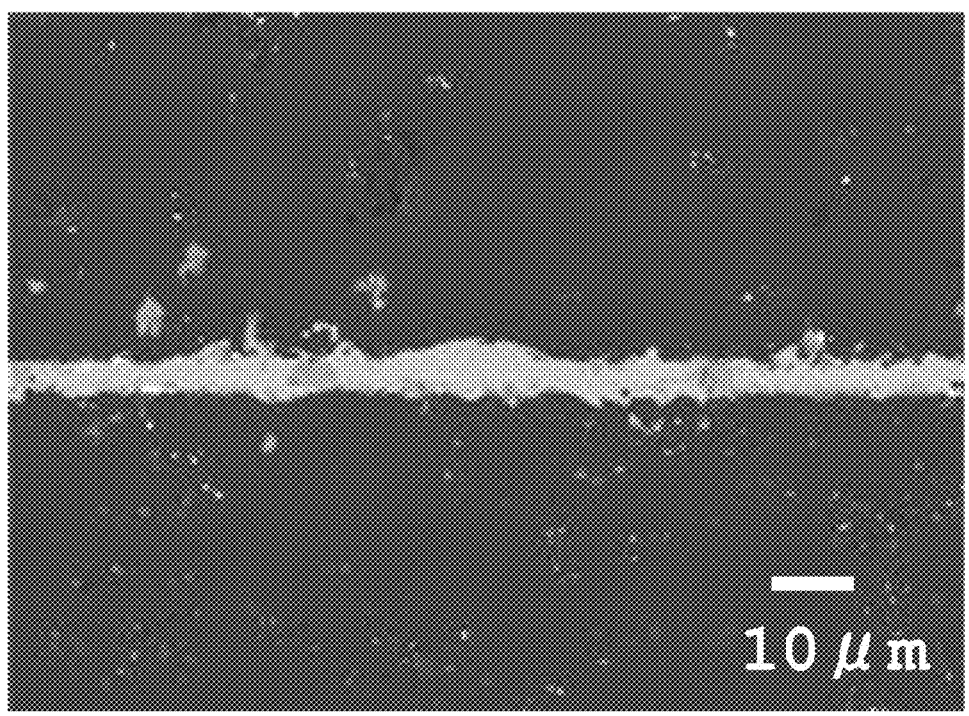

[Figure 13B]
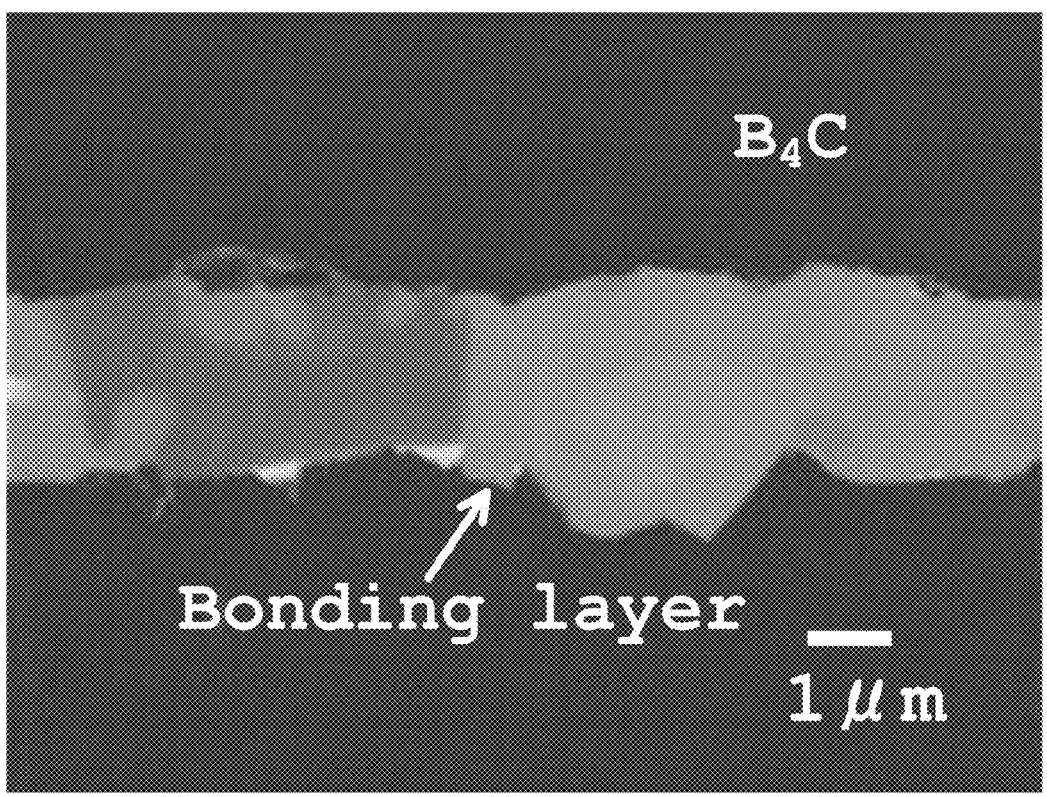

SHOCK ABSORBING MEMBER

TECHNICAL FIELD

The present invention relates to a shock absorbing member in which a bonded body obtained by bonding a plurality of members each comprising a ceramic is a main constituent material, and to a method for producing the shock absorbing member. More specifically, the present invention relates to a shock absorbing member extremely useful as a constituent material of protective equipment or the like, the shock absorbing member provided with both characteristics of having an extremely high hardness and strength while being lightweight and a function of absorbing energy that a high-speed projectile or the like has with a high efficiency, and to a method for producing the shock absorbing member.

BACKGROUND ART

In recent years, many proposals of a member excellent in absorptivity of shock energy or the like which comprises a ceramic as a main constituent material have been made. In Patent Literature 1, for example, a protective member in which a shock receiving part comprising a ceramic containing boron carbide as a main component and a basic part comprising a ceramic containing silicon nitride as a main component are bonded by a bonding layer comprising a resin is described. Moreover, in Patent Literature 2, a shock absorbing member in which a sheet made from partially stabilized zirconia and a sheet made from boron carbide, mullite, or the like are laminated and bonded with an epoxy resin or the like is described.

On the other hand, it is known that not only a shock absorbing member but also a highly functional structural material can be obtained by laminating members comprising a ceramic or the like. In Patent Literature 3, for example, a laminated sintered body useful as a cutting tool strong against thermal shock which comprises a base material comprising: a ceramic or a sintered alloy; an intermediate layer comprising a ceramic; and an outermost layer comprising a ceramic and having a thermal expansion coefficient smaller than that of the base material is described. In addition, it is described that alumina, silicon nitride, boron nitride, silicon carbide, and so on are appropriately combined to be used as a ceramic that constitutes the base material or the outermost layer.

Moreover, in Patent Literature 4, a laminated structured sintered body that is useful for a cutting tool to be used under severe conditions and comprises a metal; a ceramic such as alumina or the like; and cermet is described. Furthermore, in Patent Literature 5, a silicon nitride sintered body with a laminated structure obtained by laminating a layer of porous silicon nitride and a layer of dense silicon carbide, the silicon nitride sintered body having a strong tolerance against shock, stress, or distortion is described.

CITATION LIST

Patent Literature

Patent Literature 1: JP-A-2008-275208
Patent Literature 2: JP-A-2010-210217
Patent Literature 3: JP-A-4-319435
Patent Literature 4: JP-A-7-137199
Patent Literature 5: JP-A-9-169571

SUMMARY OF INVENTION

Technical Problem

Any of aforementioned prior arts tries to develop an intended function by combining materials each exhibiting different properties or materials of the same kind each having a different property such as porosity or the like. Namely, in the past, efforts trying to obtain a member having an intended property have been made by selecting and combining a plurality of materials each having a unique property. However, these approaches may possibly be disadvantageous in terms of cost or may possibly be an obstacle for practical application industrially because production steps become complicated. For example, a protective member described in Patent Literature 1 is heavier than a member consisting of only boron carbide and furthermore has a problem to be solved in terms of strength. Moreover, a shock absorbing member described in Patent Literature 2 has a problem of becoming heavier than a member consisting of only boron carbide.

Furthermore, since a laminated sintered body described in Patent Literature 3 is heavy for a shock absorbing member and is produced under the condition that a sintering is carried out while being pressurized, it is difficult to increase in size. Moreover, since a laminated structured sintered body described in Patent Literature 4 is produced by using chemical reaction heat of silicon, the temperature control or the like is difficult and it is also difficult to increase in size. Moreover, a silicon nitride sintered body described in Patent Literature 5 has a problem in terms of stable supply of the material as well as a problem in terms of cost and increasing in size.

The present invention has been made in consideration of the problems that these prior arts have, and a subject of the present invention is to provide a shock absorbing member extremely useful as a constituent material of protective equipment capable of destroying a high-speed projectile, minimizing the energy that fragments generated by the fracture of the high-speed projectile have, preventing an impact stress wave from going through the back side without fall, and being readily produced while being lightweight.

Solution to Problem

The present inventors have conducted diligent studies to solve the above problem to find out that it is possible to achieve the subject by bonding a plurality of first sheet-like members each comprising a ceramic and each having a predetermined thickness by using a bonding material containing at least one of the group consisting of aluminum, copper, silver, and gold, and has completed the present invention.

Namely, according to the present invention, a shock absorbing member shown below can be provided.

[1] A shock absorbing member comprising a ceramic bonded body comprising: a plurality of first sheet-like members each comprising a ceramic containing 60 mass % or more of boron carbide and each having a thickness of 0.1 to 50 mm; and a bonding layer arranged between the first sheet-like members adjacent to each other, the bonding layer bonding surfaces to be bonded facing each other of the first sheet-like members adjacent to each other, wherein the bonding layer comprises a bonding material containing at least one metal selected from the group consisting of aluminum, copper, silver, and gold.

[2] The shock absorbing member according to [1], wherein 2 to 1000 sheets of the first sheet-like members are arranged by being laminated in the thickness direction of the sheet-like members.

[3] The shock absorbing member according to [2], wherein the thickness of the first sheet-like members increases in a stepwise fashion from the surface side toward the back side of the ceramic bonded body.

[4] The shock absorbing member according to [2] or [3], wherein the ceramic bonded body further comprises one or more second sheet-like members arranged by being laminated on the first sheet-like members through the bonding layer, the second sheet-like members comprising silicon carbide, mullite, or alumina.

[5] The shock absorbing member according to any one of [1] to [4], wherein the bonding layer has a thickness of 0.001 to 1 mm.

[6] The shock absorbing member according to any one of [1] to [5], further comprising a receiving layer arranged on the back side of the ceramic bonded body, the receiving layer receiving fragments generated at the time of damage.

[7] The shock absorbing member according to any one of [1] to [6], wherein a plurality of voids are formed at an interface between the first sheet-like member and the bonding layer.

[8] The shock absorbing member according to [7], wherein a plurality of the first sheet-like members are arranged by being laminated in the thickness direction (excluding the case where the number of the sheet-like members is 2), and the shock absorbing member is used for protective equipment for protection against a shock at the time of collision of a high-speed projectile.

[9] The shock absorbing member according to [7] or [8], wherein the surface to be bonded of the first sheet-like member includes a noncontact region not contacting the bonding layer at a plurality of voids, and an area ratio of the noncontact region accounts for 6 to 60% of each surface to be bonded of the first sheet-like member.

Moreover, according to the present invention, a method for producing a shock absorbing member shown below can be provided.

[10] A method for producing a shock absorbing member according to any one of [7] to [9], comprising: a step of obtaining a laminated body by laminating a plural of the first sheet-like members in the thickness direction through the bonding layer; and a step of forming the ceramic bonded body by heating the obtained laminated body at a temperature of 600 to 1600° C., wherein the shock absorbing member satisfies at least any one of the following conditions (1) and (2).

(1) The surface to be bonded of the first sheet-like member has a maximum height of roughness Rz (JIS B 0601: 2001) of 5 μm or more.

(2) The laminated body is heated while being pressurized at a pressure of 30 kPa or less.

Advantageous Effects of Invention

The shock absorbing member of the present invention is a thin and lightweight plate-like member, and yet capable of absorbing kinetic energy of a collided high-speed projectile sufficiently. Furthermore, the shock absorbing member of the present invention is capable of destroying the collided high-speed projectile, minimizing energy of fragments generated by the fracture, and preventing a shock wave from going through the backside (rear) without fall. Furthermore, the shock absorbing member of the present invention can be readily produced, and therefore is also excellent from an economical perspective. Particularly, by combining a thickness of a sheet-like member (plate-like member) comprising a ceramic containing boron carbide and a lamination number appropriately, a higher functional shock absorbing member having a higher absorbing power of kinetic energy of a high-speed projectile compared with members described in Patent Literature 1 and 2, the outermost surface of which is hard to be broken at the time of the collision of the high-speed projectile can be provided.

BRIEF DESCRIPTION OF DRAWINGS

FIG. 1A is a partial sectional view showing one embodiment of a shock absorbing member of the present invention schematically.

FIG. 1B is a partial enlarged view of a shock absorbing member shown in FIG. 1A.

FIG. 2 is a partial sectional view showing another embodiment of the shock absorbing member of the present invention schematically.

FIG. 3 is a partial sectional view showing yet another embodiment of the shock absorbing member of the present invention schematically.

FIG. 4 is a partial sectional view showing one example of voids at a bonding interface.

FIG. 5 is a partial sectional view showing another example of voids at a bonding interface.

FIG. 6 is a partial sectional view showing yet another example of voids at a bonding interface.

FIG. 7 is a perspective view showing a noncontact region and a contact region at a bonding interface of a first sheet-like member schematically.

FIG. 8 is a photomicrograph showing an interface structure of a ceramic bonded body obtained by bonding at a pressure of 6 kPa.

FIG. 9 is a photomicrograph showing an interface structure of a ceramic bonded body obtained by bonding at a pressure of 35 kPa.

FIG. 10 is a photomicrograph showing an interface structure of a ceramic bonded body obtained by using first sheet-like members each having a maximum height of roughness of the surface to be bonded Rz of 6.0 μm.

FIG. 11 is a photomicrograph showing an interface structure of a ceramic bonded body obtained by using first-sheet like members each having a maximum height of roughness of the surface to be bonded Rz of 0.1 μm.

FIG. 12A is a photomicrograph showing an interface structure of a ceramic bonded body obtained by bonding by heating for 72 hours.

FIG. 12B is a photomicrograph obtained by enlarging FIG. 12A.

FIG. 13A is a photomicrograph showing an interface structure of a ceramic bonded body obtained by bonding by heating for 2 hours.

FIG. 13B is a photomicrograph obtained by enlarging FIG. 13A.

DESCRIPTION OF EMBODIMENTS

Hereinafter, the present invention will be described in more detail giving preferable embodiments for carrying out the present invention as examples. In the prior arts, boron carbide has been selected as a constituent material of a shock absorbing member just from viewpoints of reducing weight, enhancing strength, and enhancing hardness. On the other hand, the present inventors have recognized that it is important that a member should absorb kinetic energy of a high-speed projectile efficiently and should be made to be capable of reducing the damage to a human, a car, or the like existing inside the protective equipment by fragments generated at the time of collision of the high-speed projectile without fall in order to make the member capable of exhibiting an excellent functionality as protective equipment while maintaining lightweight. And from such recognition, the present inventors have made various studies on boron carbide as a constituent material of a shock absorbing member.

Accordingly, it has been found that a bonded body obtained by laminating a plurality of sheet-like (thin plate-like) members comprising a ceramic containing boron carbide as a main component and bonding the sheet-like members with a specified metal at a low temperature has a remarkable difference in shock absorptivity compared with a non-bonded plate of the same thickness (non-bonded body). The bonded body has exhibited mechanical properties almost equal to mechanical properties of the non-bonded body statically. However, the bonded body is capable of destroying a high-speed projectile at the time of a collision of the high-speed projectile and, by destroying the high-speed projectile finely, is capable of absorbing kinetic energy of the high-speed projectile efficiently. Moreover, since the surface is destroyed finely, it becomes easy to suppress the spread of the shock wave and maintain the shape of the surface that the collision of the high-speed projectile occurs. In addition, it is thought the shock absorbing member of the present invention is capable of destroying the collided high-speed projectile by bonding surfaces to be bonded facing each other of a plurality of the sheet-like members by a bonding layer comprising a bonding material containing a specified metal, and that the shock absorbing member of the present invention is capable of suppressing the progress of the shock wave passing through the inside of the shock absorbing member by a high stress field existing inside the ceramic bonded body. Furthermore, the present inventors have found as a result of studies that by making the sheet-like members thin together with increasing the lamination number, kinetic energy of a high-speed projectile can be transformed to surface energy efficiently.

Boron carbide is conventionally used as a constituent material of a shock absorbing member. However, since boron carbide is a hugely expensive material, boron carbide has only been used under the situation in which a high-speed projectile having an extremely high kinetic energy can collide. On the other hand, in the case of the shock absorbing member of the present invention, the thickness of the ceramic bonded body obtained by bonding a plurality of sheet-like members each containing boron carbide can be made to be thin. Therefore, the shock absorbing member of the present invention can be reduced weight and can greatly contribute to cost reduction. Namely, as a result of reducing weight, it is possible to reduce energy consumption at the time of movement while using or transportation. Therefore, it is possible to reduce load to human body or vehicles or the like. Furthermore, since the sheet-like member can be made to be thin, it is possible to shorten an amount of time in a sintering step or the like. Moreover, even in the case where a corrugated surface is formed on the surface, since it is extremely advantageous in terms of cost, the shock absorbing member of the present invention is low in production cost compared with the conventional shock absorbing member and is of great practical value. Therefore, the shock absorbing member of the present invention is expected to be adopted not only under the situation in which a high-speed projectile can collide but also in various technical fields.

FIG. 1A is a partial sectional view showing one embodiment of a shock absorbing member of the present invention schematically. Moreover, FIG. 1B is a partial enlarged view of a shock absorbing member shown in FIG. 1A. As shown in FIGS. 1A and 1B, the shock absorbing member 50 of the present embodiment comprises a ceramic bonded body 15 comprising a plurality of first sheet-like members 5 each comprising a ceramic and a bonding layer 65 arranged between the first sheet-like members adjacent to each other. First sheet-like members 5 are arranged by being laminated in the thickness direction. The bonding layer 65 bonds surfaces to be bonded 5a, 5b facing each other of the first sheet-like members 5 adjacent to each other. A ceramic as a constituent material of the first sheet-like member 5 contains 60 mass % or more of boron carbide, preferably 80 mass % or more, more preferably 90 mass % or more By laminating the first sheet-like members formed by a ceramic containing boron carbide, an extremely excellent shock absorptivity can be obtained. In addition, an upper limit value of a ratio of boron carbide contained in the ceramic is not particularly limited, but is most preferably 100 mass %.

The first sheet like member 5 has a thickness of 0.1 to 50 mm, preferably 1 to 10 mm. When the thickness of the first sheet-like member is less than 0.1 mm, the thickness is too thin and therefore there sometimes occurs the lack of practicability in terms of production. On the other hand, when the thickness of the first sheet-like member exceeds 50 mm, the shock absorptivity is deteriorated.

The number of the first sheet-like members constituting the ceramic bonded body is not particularly limited as long as the number of the first sheet-like members is plural, however, usually 2 to 1000 sheets, preferably 5 to 50 sheets. When the lamination number of the first sheet-like members is too small, there sometimes occurs a case where an effect obtained by laminating becomes insufficient. On the other hand, the lamination number of the first sheet-like members is too large, not only the effect reaches plateau but also the handling property as protective equipment tends to deteriorate because the obtained ceramic bonded body becomes heavy.

Boron carbide contained in the ceramic bonded body constituting the first sheet-like member 5 has a low density as well as a high hardness. Therefore, the first sheet-like member 5 arranged in the outermost surface with which a high-speed projectile collides can destroy the collided high-speed projectile by the property of boron carbide. Moreover, the ceramic bonded body 15 obtained by laminating and bonding a plurality of the first sheet-like members has the same mechanical property as boron carbide and has a high stress field at a bonding interface. Therefore, at the time of collision of a high-speed projectile, the ceramic bonded body absorbs kinetic energy of the high-speed projectile by the first sheet-like member 5 being destroyed finely. In addition, it is preferable that the first sheet-like member comprising boron carbide is dense and has a relative density of 89% or more. As described above, the ceramic bonded body obtained by laminating and bonding a plurality of first sheet-like members each comprising a ceramic containing boron carbide as a main component has a high stress field inside thereof. This stress field deflects the shock wave passing through the inside of the ceramic bonded body at the time of collision of a high speed frying object. Due to this deflection, the shock toward the inside of the shock absorbing member of the present invention is relaxed remarkably.

The bonding layer 65 is formed by a bonding material. In the present invention, the bonding layer is formed by a bonding material comprising at least one kind of metal selected from the group consisting of aluminum, copper, silver, and gold in consideration of strength, specific gravity, simpleness of steps, or the like. Moreover, the ceramic bonded body 15 constituting the shock absorbing member 50 of the present embodiment preferably has a flexural strength of 100 MPa or more. In addition, "the flexural strength" in the present description means a physical property of the ceramic bonded body including a bonding part measured by a four-point bending method.

It is preferable that the bonding layer 65 has a thickness of 0.001 to 1 mm, more preferably 0.005 to 0.1 mm, particularly preferably 0.01 to 0.05 mm. In addition, the thickness of the bonding layer can be adjusted by changing the amount (thickness) of the bonding material to be used. When the thickness of the bonding layer is less than 0.001 mm, there sometimes occurs a case where the bonding strength is insufficient. On the other hand, when the thickness of the bonding layer exceeds 1 mm, there sometimes occurs a case where the bonding strength is insufficient because the amount of the metal is excessive and the ceramic is peeled off.

Boron carbide is lightweight and has a low fracture toughness value, and therefore breaks finely when a shock is applied. Thus, boron carbide is preferable as a material for constituting the shock absorbing member of the present invention. In addition, the present inventors have already developed a technology for producing boron carbide economically (see International Publication No. WO2008/153177). By utilizing this technology, not only sheet-like members but also members of various shapes comprising boron carbide can be provided. Furthermore, the present inventors have already developed an industrially advantageous technology for bonding members comprising boron carbide (see Japanese Patent Laid-Open No. 2012-072044). By utilizing this technology, a wider range of applications of shock absorbing members are expected.

FIG. 4 is a partial sectional view showing one example of voids at a bonding interface. As shown in FIG. 4, it is preferable that a plurality of voids 80 is formed at an interface between first sheet-like member 6 of the ceramic bonded body constituting the shock absorbing member of the present invention and the bonding layer 66. The shock wave generated at the time of collision of a high-speed projectile is effectively deflected by these plurality of voids 80 and is suppressed to be transmitted linearly from the surface (collision surface) side of the ceramic bonded body to the back side. Thereby, the shock toward the inside of the shock absorbing member of the present invention becomes remarkably relaxed.

Moreover, as shown in FIG. 5, a plurality of voids 82 may be formed so as to penetrate through the bonding layer 67 bonding surfaces to be bonded 100 facing each other of the first sheet-like member 7. Furthermore, as shown in FIG. 6, a plurality of voids may be formed at a depression in the surface to be bonded 100 of the first sheet-like member 8.

A plurality of voids present at the interface between the first sheet-like member and the bonding layer correspond to what is called bonding defects formed by the sheet-like members adjacent to each other being bonded without adhering completely. Namely, the propagation of the shock wave generated at the time of collision of a high-speed projectile is suppressed more effectively by controlling the bonding state of the first sheet-like members appropriately and forming a plurality of voids as bonding defects at will.

As shown in FIG. 7, the surface to be bonded 100 of the first sheet-like member 35 includes a noncontact region 90 that does not contact a bonding layer at a plurality of voids and a contact region 95 that contacts the bonding layer. And it is preferable that an area ratio of the noncontact region 90 accounts for 6 to 60% of each surface to be bonded 100 of the first sheet-like member 35, more preferably 6 to 55%, particularly preferably 6 to 40%. When the area ratio of the noncontact region accounts for less than 6% of the surface to be bonded, since an amount (volume) of voids is too small, there sometimes occurs a case where the effect of deflecting the shock wave generated at the time of collision of a high-speed projectile is deteriorated. On the other hand, when the area ratio of the noncontact region accounts for more than 60%, since an amount (volume) of voids is too large, since the bonding strength of the first sheet-like members adjacent to each other is lowered, there sometimes occurs a case where the flexural strength of the ceramic bonded body is lowered.

In the shock absorbing member of the present invention, it is preferable that the ceramic bonded body further comprises one or more second sheet-like members arranged by being laminated on the first sheet-like members through a bonding layer. A material constituting the second sheet-like members includes ceramics such as silicon carbide, a mullite, alumina, and so on. When the ceramic bonded body is constituted by combining the second sheet-like members comprising these ceramics with the first sheet-like members, it is possible to further relax the shock toward the inside of the second sheet-like members (human body or vehicles or the like), and therefore the shock absorbing member of the present invention is more useful as a constituent member for protective equipment. The reason is that the second sheet-like member comprising the above ceramic has a high ability to transform kinetic energy of a high-speed projectile to surface energy.

FIG. 2 is a partial sectional view showing another embodiment of the shock absorbing member of the present invention schematically. The shock absorbing member 55 of the embodiment shown in FIG. 2 comprises the ceramic bonded body 15 in which a plurality of first sheet-like members 5 are bonded through the bonding layer (not shown in the figure) and a receiving layer comprising a third sheet-like member 30 and fourth sheet-like member 40 each arranged in the back side of ceramic bonded body 15. By installing such a receiving layer in the back side of the ceramic bonded body, it becomes possible to receive fragments generated by the damage of the ceramic bonded body more surely and to make it harder to penetrate to the back side. In addition, a state in which the receiving layer 70 comprising a third sheet-like member 30 and a fourth sheet-like member 40 is arranged is shown in FIG. 2, however the receiving layer 70 may be constituted by a third sheet-like member alone or may be constituted by a fourth sheet-like member alone.

A material constituting the third sheet-like member 30 includes high strength fiber such as an aramid fiber or the like. Moreover, a material constituting the fourth sheet-like member 40 includes a metal having a low specific gravity such as aluminum and magnesium. These materials that can constitute the third sheet-like member or the fourth sheet-like member are often supplied in a plate shape and therefore are preferable also from the standpoint of being low cost. In addition, the fourth sheet-like member comprising a metal or the like may be arranged on the side that is the farthermost side (back side) from the outermost surface, the side facing a human being, a vehicle, or the like to be protected.

FIG. 3 is a partial sectional view showing yet another embodiment of the shock absorbing member of the present invention schematically. The shock absorbing member 60 of the embodiment shown in FIG. 3 comprises the ceramic bonded body 25; and the third sheet-like member 30 and fourth sheet-like member 40 to be a receiving layer arranged on the back side of the ceramic bonded body 25. And the ceramic bonded body 25 is constituted in such a way that the thickness of the first sheet-like members 10 and 20 increases from the surface side toward the back side in a stepwise fashion. By increasing the thickness of first sheet-like members 10 and 20 from the surface side toward the back side in a stepwise fashion like this (to be thicker), distribution in the stress field existing internally is generated. Therefore, the direction of progress of the shock wave generated at the time of collision of a high-speed projectile is deflected, and the size of fragments of ceramics generated by the damage of the ceramic bonded body is controlled and the scattering to the back side is effectively prevented.

Suppose a high-speed projectile collides on the surface side (the side on which the first sheet-like members 10 are arranged) of the shock absorbing member 60 shown in FIG. 3. In this case, the high-speed projectile colliding with the first sheet-like members 10 is destroyed, and, at the same time, a ceramic constituting the first sheet-like members 10 and comprising boron carbide is finely destroyed. Therefore, kinetic energy of the high-speed projectile is efficiently absorbed. Moreover, by the attenuated shock wave, the thicker first sheet-like members 20 arranged on the back side of the first sheet-like members 10 are damaged to form a large fragments. Thereby, kinetic energy of the high-speed projectile becomes almost perfectly absorbed. And fragments generated by the damage of ceramic bonded body 25 are absorbed by the third sheet-like member 30 and fourth sheet-like member 40 that constitute a receiving layer 70 arranged on the back side of the ceramic bonded body 25, and the fragments are not penetrated to the back side. In addition, by constituting the ceramic bonded body 25 in such a way that the thickness of the first sheet-like members 10, 20 is increased in a stepwise fashion from the surface side toward the back side, it is possible to make the thickness of ceramic bonded body 25 thinner and to make the weight of the shock absorbing member 60 remarkably light while maintaining the function equal to or higher than the conventional shock absorbing member.

In addition, as described above, the first sheet-like members 5 constituting the shock absorbing member 50 shown in FIG. 1A are arranged by being laminated in the thickness direction thereof. However, in the present invention, a plurality of the first sheet-like members are not limited to be arranged by being laminated in the thickness direction and, for example, may be arranged in being lined side by side in the lateral direction. When a plurality of the first sheet-like members are arranged by being lined side by side in the lateral direction, a bonding layer is arranged between the end faces (narrow end faces) of the first sheet-like members adjacent to the bonding layer and bonds the first sheet-like members adjacent to each other. By constituting the first sheet-like members in this way, it becomes possible to make the shape of the shock absorbing member of the present invention a bent shape. Therefore, it is possible to easily obtain, for example, a shock absorbing member formed in accordance with a bent shape of a human shoulder, elbow, or the like.

In order to obtain the ceramic bonded body constituting the shock absorbing member of the present invention, for example, a bonding material containing a metal such as aluminum or the like is interposed at the part that bonds first-sheet like members. The bonding material may be arranged at the predetermined part so that the thickness of the bonding material becomes about 1 mm or less. Moreover, the boning material may be arranged, for example, in any one of the states such as foil, paste, and deposition layer. The ceramic bonded body can be obtained by maintaining the state as it is and heating at least a part to be bonded at a temperature of 600 to 1600° C. under vacuum condition, under inert gas atmosphere, or in the atmosphere.

In addition, (1) in the case where the heating is carried out under vacuum condition, at least the part to be bonded may be heated at a temperature of 600 to 1500° C. Moreover, (2) in the case where the heating is carried out under an inert gas atmosphere, at least the part to be bonded may be heated at a temperature of 600 to 1600° C. Furthermore, (3) in the case where the heating is carried out in the atmosphere, at least the part to be bonded may be heated at a temperature of 600 to less than 800° C. The ceramic bonded body can be obtained by heating the laminated body under the condition described above. In addition, the obtained ceramic bonded body may be used as a shock absorbing member as it is, or the shock absorbing member may be constituted by appropriately arranging the second sheet-like member, the receiving layer, or the like.

Next, a method for producing a shock absorbing member in which a plurality of voids are formed at an interface between a first sheet-like member and a bonding layer among the shock absorbing members of the present invention (a method for producing a shock absorbing member of the present invention) will be described. The method for producing a shock absorbing member of the present invention comprises a step of obtaining a laminated body by laminating a plurality of first sheet-like members in the thickness direction trough a bonding material (laminating step) and a step of forming a ceramic bonded body by heating the obtained laminated body (bonding step).

In the laminating step, a bonding material containing a metal such as aluminum or the like is arranged at a part bonding the first sheet-like members (a surface to be bonded). The bonding material may be arranged at a predetermined part so that the thickness of the bonding material becomes about 1 mm or less. Moreover, the boning material may be arranged, for example, in anyone of the states such as foil, paste, and deposition layer. In this way, a laminated body can be obtained by laminating a plurality of the first sheet-like members in the thickness direction through the bonding material.

In the bonding step, at least a part to be bonded of the laminated body obtained by the aforementioned laminating step is heated at a temperature of 600 to 1600° C. under vacuum condition, under inert gas atmosphere, or in the atmosphere. In addition, in order to form a plurality of voids at the interface between the first sheet-like member and the bonding layer, at least any one of the following methods from (i) to (iv) may be used.

(i) The laminated body is heated in a pressurized state at a pressure of 30 kPa or less in the lamination direction, preferably 20 kPa or less. It is particularly preferable that the laminated body is heated without loading pressure to the laminated body except the laminated body's own weight (without applying pressure).

(ii) A metal foil in which a plurality of through holes and/or recessed parts are formed is used as a bonding material, preferably a perforated metal foil is used as a bonding material.

(iii) A first sheet-like member having concaves and convexes formed on the surface to be bonded, the first sheet-like member preferably having a maximum height of roughness Rz of the bonded surface (JIS B 0601:2001) of 5.0 μm or more, is used.

(iv) The heating time is made to be long, preferably 15 hours or more.

In addition, (1) in the case where the heating is carried out under vacuum condition, at least the part to be bonded may by heated at a temperature of 600 to 1500° C. Moreover, (2) in the case where the heating is carried out under an inert gas atmosphere, at least the part to be bonded may be heated at a temperature of 600 to 1600° C. Furthermore, (3) in the case where the heating is carried out in the atmosphere, at least the part to be bonded may be heated at a temperature of 600 to less than 800° C. The ceramic bonded body in which a plurality of voids are formed at the interface between the first sheet-like member and the bonding layer can be obtained by heating the laminated body under the condition described above. In addition, the obtained ceramic bonded body may be used as a shock absorbing member as it is, or the shock absorbing member may be constituted by appropriately arranging the second sheet-like member, the receiving layer, or the like.

FIG. 8 is a photomicrograph showing an interface structure of a ceramic bonded body obtained by bonding at a pressure of 6 kPa. Moreover, FIG. 9 is a photomicrograph showing an interface structure of a ceramic bonded body obtained by bonding at a pressure of 35 kPa. As shown in FIG. 8, when the laminated body is heated and bonded in a state where a relatively low pressure is loaded in the lamination direction, a plurality of voids are formed at the interface between the first sheet-like member (boron carbide ($B_4C$)) and the bonding layer. On the other hand, as shown in FIG. 9, when the laminated body is heated and bonded in a state where a high pressure is loaded in the lamination direction, a void is not formed at the interface between the first sheet-like member (boron carbide (B4C)) and the bonding layer, and the first-sheet like members adjacent to each other are completely adhered.

FIG. 10 is a photomicrograph showing an interface structure of the ceramic bonded body obtained by using a first-sheet like members each having a maximum height of roughness Rz of the bonded surface 6.0 μm. Moreover, FIG. 11 is a photomicrograph showing an interface structure of the ceramic bonded body obtained by using first-sheet like members each having a maximum height of roughness Rz of the bonded surface 0.1 μm. As shown in FIG. 10, when the first sheet-like member having concaves and convexes on the surface to be laminated is used, a plurality of voids are formed at the interface between the first sheet-like member (boron carbide (B4C)) and the bonding layer. On the other hand, as shown in FIG. 11, when a first sheet-like member having sufficiently small concaves and convexes on the surface to be laminated is used, a void is not formed at the interface between the first sheet-like member (boron carbide (B4C)) and the bonding layer, and the first-sheet like members adjacent to each other are almost completely adhered.

FIG. 12A is a photomicrograph showing an interface structure of a ceramic bonded body obtained by bonding by heating for 72 hours. FIG. 12B is a photomicrograph obtained by enlarging FIG. 12A. Moreover, FIG. 13 A is a photomicrograph showing an interface structure of a ceramic bonded body obtained by bonding by heating for 2 hours, and FIG. 13B is a photomicrograph obtained by enlarging FIG. 13A. As shown in FIGS. 12A and 12B, when the laminated body is heated for a long time and bonded, a plurality of voids are formed at the interface between the first sheet-like member (boron carbide ($B_4C$)) and the bonding layer. On the other hand, as shown in FIGS. 13A and 13B, when the laminated body is heated for a short time and bonded, a void is not formed at the interface between the first sheet-like member and the bonding layer, and the first sheet-like members adjacent to each other are completely adhered.

It is thought that aluminum has a good wettability to boron carbide and therefore can be uniformly spread out through the face to be bonded easily. Moreover, aluminum forms various compounds with boron such as aluminum borides and compounds comprising aluminum, carbon, and boron. Therefore, it is thought that when a bonding material containing 90 mass % or more of aluminum is interposed between the first sheet-like members and heated while maintaining this state at a temperature higher than the melting point of aluminum, aluminum spreads out through the face to be bonded in a uniform state, then boron carbide reacts with aluminum, and the bonding layer in which these reacted compounds are present in a mixed state is formed. Namely, in the bonding layer, aluminum does not exist as a single substance, but aluminum borides, aluminum carboborides, and so on are generated, and these compounds are present in a mixed state, and as a result, the first sheet-like members are firmly bonded through this bonding layer. Thus, it is presumed that a ceramic bonded body that cannot be obtained by the prior arts, the ceramic bonded body exhibiting a bonding strength of 100 MPa or more almost equal to the ceramics consisting of only boron can be obtained.

In the bonding layer obtained in the manner as described above, any one of metal aluminum; any one of aluminum carboborides represented by $Al_3BC$, $Al_3B_{48}C_2$, $AlB_{12}C_2$, $Al_8B_4C_7$, $Al_2B_{51}C_8$, $AlB_{40}C_4$, and $AlB_{24}C_4$; any one of aluminum borides represented by $AlB_2$, $AlB_{10}$, and $AlB_{12}$ is present. And in the ceramic bonded body obtained in the manner as described above, for example, cracks and/or voids are present in the surface of the first sheet-like members in the bonding layer, and the bonding material is penetrated inside these cracks or voids. Therefore, by an anchoring effect of the bonding material penetrated inside the cracks or voids, the first sheet-like members adjacent to each other are firmly integrated.

On the other hand, when copper, silver, and gold are heated at a temperature higher than these respective melting points, it is thought that these metals have a good wettability to boron and therefore can be uniformly spread out through the bonding layer easily. Moreover, copper, silver, and gold have a poor reactivity with boron carbide or boron and therefore exist stably in a state as copper, silver, and gold respectively to a high temperature even when heated in a state of contacting boron carbide or boron. Thus, an anchoring effect works by copper, silver, and gold penetrating inside the cracks and/or voids present on the surface of the first sheet-like member in the bonding layer, when copper, silver, and gold are heated. Thereby, the sheet-like members adjacent to each other are firmly integrated.

EXAMPLES

Hereinafter, the present invention will be described specifically, however the present invention is not limited to these Examples. In addition, "parts" and "%" are based on mass unless otherwise noted.

(Preparation of First Sheet-Like Members (1))

A commercially available boron carbide ($B_4C$) powder was filled to a 9 cm square mold and pressurized at a pressure of 200 kg/cm², thereafter a hydrostatic pressing at a pressure of 1000 kg/cm² was carried out to obtain a boron carbide molded body of which thickness after sintering/processing was 0.1 to 50 mm. In addition, a boron carbide powder having an average particle size of 0.8 μm, a purity of 99.5% (an oxygen content of 1.2% and a nitrogen content of 0.2% were excluded) was used. The obtained boron carbide molded body was placed in a sintering furnace in which aluminum and silicon were arranged, maintained and fired at 2200° C. for 4 hours while argon (Ar) gas was being flowed under normal pressure to obtain a fired body. The obtained fired body was subjected to a grinding process with a diamond grinding stone to obtain 7 cm square first sheet-like members each comprising boron carbide so that a thickness of each first sheet-like member was 0.1 to 50 mm. All of the obtained sheet-like members had a relative density of 95% or more and were extremely dense.

(Preparation of Receiving Layer)

A 7 cm square third sheet-like member having a thickness of 3 mm was prepared by laminating a plurality of sheets with a thickness of 1 mm constituted of a commercially available aramid based fiber comprising an aromatic aramid based resin (Kevlar: Trade Mark, manufactured by E.I. du Pont de Nemours and Company) and integrating the laminated sheets with an epoxy resin. And a 7 cm square metal plate made of aluminum having a thickness of 4 mm was prepared and used as a fourth sheet-like member.

Example 1

A laminated body was obtained by laminating 100 sheets of first sheet-like members each having a thickness of 0.1 mm with aluminum films each having a thickness of 10 μm (purity: 99%) interposed therebetween. The first sheet-like members were bonded by heating the obtained laminated body in a vacuum at 1000° C. for 2 hours to obtain a ceramic bonded body having a thickness of 10 mm. The obtained ceramic bonded body was used as a shock absorbing member (Example 1).

Examples 2 to 14, Comparative Examples 1 and 3

Shock absorbing members (Examples 2 to 14, Comparative Examples 1 and 3) each being a ceramic bonded body were obtained in the same manner as in the aforementioned Example 1 except that the thickness and number of sheets of the first sheet-like members, used films made of a metal (bonding layer), and the heating temperature were set as shown in Table 1.

Comparative Example 2

A first sheet-like member not being bonded with a film made of a metal such as aluminum or the like and having a thickness of 10 mm was used as a shock absorbing member (Comparative Example 2).

(Impact Fracture Test (1))

An impact fracture test was carried out by using a gas accelerating device transmitting a pressure of a compressed gas to a projectile and colliding the projectile passing through an emission tube with a sample. In addition, a bearing steel having a diameter of 4 mmϕ was used as a projectile. Moreover, by colliding the projectile with the sample (shock absorbing member) at a speed almost equal to sonic speed, the damaged volume (cm³) and the average particle size of generated fragments (mm) were measured. The results are shown in Table 1.

TABLE 1

| | First sheet-like member | | Heating | | Average |
| --- | --- | --- | --- | --- | --- |
| | Thickness (mm) | Number of sheets | Bonding layer | temperature (° C.) | Damaged volume (cm³) | size of fragments (mm) |
| Example 1 | 0.1 | 100 | Al | 1000 | 1.2 | 1.3 |
| Example 2 | 0.5 | 20 | Al | 1000 | 1.6 | 1.6 |
| Example 3 | 1 | 10 | Al | 1000 | 2 | 2.1 |
| Example 4 | 2 | 5 | Al | 1000 | 3.8 | 4 |
| Example 5 | 5 | 2 | Al | 1000 | 5.6 | 6.2 |
| Comparative Example 1 | 0.05 | 200 | Al | 1000 | unmeasurable | unmeasurable |
| Comparative Example 2 | 10 | 1 | nothing | — | 8.1 | 14 |
| Example 6 | 0.1 | 100 | Cu | 1500 | 1.8 | 1.5 |
| Example 7 | 1 | 10 | Cu | 1500 | 2.4 | 2.4 |
| Example 8 | 5 | 2 | Cu | 1500 | 6.3 | 7.1 |
| Example 9 | 0.1 | 100 | Ag | 1400 | 1.9 | 1.4 |
| Example 10 | 1 | 10 | Ag | 1400 | 2.5 | 2.4 |
| Example 11 | 5 | 2 | Ag | 1400 | 6.3 | 7 |
| Example 12 | 0.1 | 100 | Au | 1300 | 1.5 | 1.6 |
| Example 13 | 1 | 10 | Au | 1300 | 2.2 | 2.6 |
| Example 14 | 5 | 2 | Au | 1300 | 6 | 5.9 |
| Comparative Example 3 | 0.05 | 200 | Cu | 1500 | unmeasurable | unmeasurable |

(Evaluation)

As shown in Table 1, the damaged volume at the cone-like damaged part was smaller and the average particle size of the generated fragments was smaller as the thickness of the first sheet-like member is thinner (Example 1 to 14, Comparative Example 2). However, the shock absorbing members of Comparative Example 1 and 3 (a thickness of the first sheet-like member=0.05 mm) were damaged in such a way that the bonding surfaces of the first sheet-like members were peeled off, thus it was impossible to measure the damaged volume and the average particle size of fragments. Moreover, it was found that the shock absorbing member of Comparative Example 2 consisting of only a nonbonded first sheet-like member having a thickness of 0.1 mm had a large damaged volume because large fragments were scattered backward. In addition, while cracks are generated freely though the surface with which the projectile collided in the shock absorbing member of Comparative Example 2, cracks running freely were hardly observed in the shock absorbing members of Examples 1 and 6 obtained by laminating 100 sheets of first sheet-like members having a thickness of 0.1 mm Example 15

A laminated body was obtained by laminating 20 sheets of first sheet-like members each having a thickness of 5 mm with aluminum films each having a thickness of 10 μm (purity: 99%) interposed therebetween. The first sheet-like members were bonded by heating the obtained laminated body in a vacuum at 1000° C. for 2 hours to obtain a ceramic bonded body having a thickness of 100 mm. The obtained ceramic bonded body was used as a shock absorbing member (Example 15).

Examples 16 to 24

Shock absorbing members (Examples 16 to 24) each being a ceramic bonded body were obtained in the same manner as in the aforementioned Example 15 except that the thickness and number of sheets of the first sheet-like members, used films made of a metal (bonding layer), and the heating temperature were set as shown in Table 2.

Comparative Example 4

A first sheet-like member having a thickness of 100 mm not bonded with a film made of a metal such as aluminum or the like was used as a shock absorbing member (Comparative Example 4).

(Impact Fracture Test (2))

A fracture test was carried out in the same manner as in the aforementioned "Impact Fracture Test (1)" except that the projectile was collided with the sample (shock absorbing member) at 3 times the speed of sound. In addition, the projectile was not penetrated in any of the shock absorbing members (Examples 15 to 24, Comparative Example 4), and therefore, "the extent of cracks" and "the intervals of cracks" were evaluated by visually observing the surface with which the projectile collided. The results were shown in Table 2.

TABLE 2

| | First sheet-like member | | | Heating | | |
|---|---|---|---|---|---|---|
| | Thickness (mm) | Number of sheets | Bonding layer | temperature (° C.) | Extent of cracks | Intervals of cracks |
| Example 15 | 5 | 20 | Al | 1000 | small | wide |
| Example 16 | 10 | 10 | Al | 1000 | small | wide |
| Example 17 | 20 | 5 | Al | 1000 | somewhat large | somewhat narrow |
| Example 18 | 50 | 2 | Al | 1000 | somewhat large | somewhat narrow |
| Comparative Example 4 | 100 | 1 | nothing | — | large | narrow |
| Example 19 | 5 | 20 | Cu | 1500 | small | wide |
| Example 20 | 10 | 10 | Cu | 1500 | small | wide |
| Example 21 | 20 | 5 | Cu | 1500 | somewhat large | somewhat narrow |
| Example 22 | 50 | 2 | Cu | 1500 | somewhat large | somewhat narrow |
| Example 23 | 10 | 10 | Ag | 1400 | small | wide |
| Example 24 | 10 | 10 | Au | 1300 | small | wide |

(Evaluation)

As shown in Table 2, in the shock absorbing member of Comparative Example 4, a large number of cracks were generated, and at the same time, the intervals of the cracks were narrow. On the other hand, in the shock absorbing members of Examples 15 to 24, it is evident that as the number of lamination of first sheet-like members is larger and as the thickness of the first sheet-like member is thinner, the number of generated cracks tends to be smaller and the intervals thereof tend to be wider. Moreover, there was not a big difference in breakdown behavior by the difference of metal films.

Example 25

A shock absorbing member having a layer constitution as shown in FIG. 2 (Example 25) was prepared by laminating: a sheet (thickness 10 mm) obtained by laminating the ceramic bonded body (thickness 10 mm) prepared in Example 3 and a sheet comprising an aramid based fiber, and integrating the resultant laminated body with an epoxy resin; and a metal plate made of aluminum (thickness 10 mm) in this order.

Example 26

A shock absorbing member having a layer constitution as shown in FIG. 2 (Example 26) was prepared by laminating a sheet (thickness 10 mm) obtained by laminating the ceramic bonded body (thickness 10 mm) prepared in Example 8 and a sheet comprising an aramid based fiber, and integrating the resultant laminated body with an epoxy resin; and a metal plate made of aluminum (thickness 10 mm) in this order.

Comparative Example 5

A shock absorbing member (Comparative Example 5) was prepared by laminating a sheet (thickness 10 mm) obtained by laminating: the first sheet-like member having a thickness of 10 mm and used in Comparative Example 2 and an aramid based fiber, and integrating the resultant laminated body with an epoxy resin; and a metal plate made of aluminum (thickness 10 mm) in this order.

(Evaluation)

The aforementioned "Impact Fracture Test (1)" was carried out for the shock absorbing members of Examples 25 and 26, and Comparative Example 5. In consequence, the projectile was destroyed on any of the surfaces of the shock absorbing members. However, the back sides of the shock absorbing members (metal plates made of aluminum) were in different situations. In the shock absorbing member of Comparative Example 5, a hole having a diameter of about 2 mm was formed in the metal plate made of aluminum. On the other hand, in the shock absorbing members of examples 25 and 26, no appearance changes were observed on the metal plates made of alumina.

Example 27

Laminated were 4 sheets of the first sheet-like members each having a thickness of 0.5 mm with aluminum films (purity: 99%) each having a thickness of 10 μm interposed therebetween. Laminated were further 5 sheets of the first sheet-like members each having a thickness of 1 mm with aluminum films (purity: 99%) each having a thickness of 10 μm interposed therebetween to obtain a laminated body. The first sheet-like members were bonded by heating the laminated body in a vacuum at 1000° C. for 2 hours to obtain a ceramic bonded body having a thickness of 7 mm. A shock absorbing member (Example 27) having a layer constitution as shown in FIG. 3 was prepared by laminating: a sheet (thickness 10 mm) obtained by laminating the obtained ceramic bonded body and a sheet comprising an aramid based fiber and integrating the resultant laminated body with an epoxy resin; and a metal plate made of aluminum (thickness 10 mm) in this order.

Example 28

Laminated were 4 sheets of the first sheet-like members each having a thickness of 0.5 mm with copper films (purity:

99%) each having a thickness of 10 µm interposed therebetween. Laminated were further 5 sheets of the first sheet-like members each having a thickness of 1 mm with copper films (purity: 99%) each having a thickness of 10 µm interposed therebetween to obtain a laminated body. The first sheet-like members were bonded by heating the laminated body in a vacuum at 1500° C. for 2 hours to obtain a ceramic bonded body having a thickness of 7 mm. A shock absorbing member (Example 28) having a layer constitution as shown in FIG. 3 was prepared by laminating a sheet (thickness 10 mm) obtained by laminating the obtained ceramic bonded body and a sheet comprising an aramid based fiber and integrating the resultant laminated body with an epoxy resin; and a metal plate made of aluminum (thickness 10 mm) in this order.

(Evaluation)

The aforementioned "Impact Fracture Test (1)" was carried out for the shock absorbing members of Examples 27 and 28. In consequence, the projectile was destroyed on the surfaces of the shock absorbing members, and no appearance changes were observed on the metal plate made of aluminum. In addition, a laminated body prepared by a silver or gold film gave a similar result.

From the above results, it turned out that a higher shock absorptivity was exhibited by using larger numbers of the first sheet-like members each having a thinner thickness.

(Preparation of First Sheet-Like Member (2))

A commercially available boron carbide ($B_4C$) powder was filled to a 9 cm square mold and pressurized at a pressure of 200 kg/cm$^2$, thereafter a hydrostatic pressing at a pressure of 1000 kg/cm$^2$ was carried out to obtain a boron carbide molded body of which thickness after sintering/processing was 0.1 to 50 mm. In addition, a boron carbide powder having an average particle size of 0.8 µm, a purity of 99.5% (an oxygen content of 1.2% and a nitrogen content of 0.2% were excluded) was used. The obtained boron carbide molded body was placed in a sintering furnace in which aluminum and silicon were arranged, maintained and fired at 2200° C. for 4 hours while argon (Ar) gas was being flowed under normal pressure to obtain a fired body. The obtained fired body was subjected to a grinding process with a diamond grinding stone to obtain 7 cm square first sheet-like members each comprising boron carbide so that a thickness thereof was 0.1 to 50 mm and a maximum height of roughness Rz of the bonded surface (JIS B 0601: 2001) was 0.1 to 6.0 µm. All of the obtained sheet-like members had a relative density of 95% or more and were extremely dense.

(Confirming Presence or Absence of Voids)

It was confirmed that a plurality of voids were formed at the interface between the first sheet-like member and the bonding layer by using a water immersion ultrasonic image forming apparatus having a constitution shown below and by scanning a focusing type ultrasonic probe in a horizontal plane and forming an image from amplitudes of reflected waves.

Low distortion large amplitude burst wave transmitter-receiver (trade name "RITEC RPR-4000" (manufactured by RITEC Inc.), transmission frequency: 0.3 to 20 MHz, burst wave cycle number: 1 to 256, maximum excitation voltage: 1800V$_{p\text{-}p}$, maximum reception amplification factor: 99 dB)

Seven-axis scanner

Image forming software (trade name "FlexScan" (produced by Insight K.K.))

Synchronization unit

Multistage changeover high path filter

Focusing type ultrasonic probe (Method for Measuring Area Ratio of Noncontact Region)

The contact region and the noncontact region were separated by using an image processing software (trade name "FlexScan" (produced by Insight K.K.)) according to the method described in the aforementioned "Confirming Presence or Absence of Voids". And according to the following formula (1), the area ratio of the noncontact region in the surface to be bonded in the first sheet-like member was calculated.

Area ratio of noncontact region in the surface to be bonded of the first sheet-like member (%)=(area of noncontact region/area of the surface to be bonded of the first sheet-like member)×100 (1)

Example 29

A laminated body was obtained by laminating 10 sheets of 7 cm square first sheet-like members each having a thickness of 1 mm and a maximum height of roughness Rz of the bonded surface ded of 2.0 µm with 7 cm square aluminum films (purity: 99%) each having a thickness of 10 µm in which 25 holes having a diameter of 4 mmφ are made interposed therebetween. The first sheet-like members were bonded by heating the obtained laminated body in a vacuum at 1000° C. for 2 hours while pressurizing at a pressure of 35 kPa in the lamination direction to a ceramic bonded body having a thickness of 10 mm. The ceramic bonded body was used as a shock absorbing member (Example 29). A plurality of voids were formed at the interface between the first sheet-like member and the bonding layer of the obtained shock absorbing member. Moreover, an area ratio of the noncontact region was 6%.

Examples 30 to 43

Shock absorbing members (Examples 30 to 43) were obtained in the same manner as in the aforementioned Example 29 except that the first sheet-like members shown in Table 3-1 were used and bonded under the conditions shown in Table 3-1. The presence or absence of voids and the area ratios in the obtained shock absorbing members are shown in Table 3-2.

Comparative Example 6

A shock absorbing member (Comparative Example 6) being a ceramic laminated body was obtained in the same manner as in the aforementioned Example 29 except that a bonding material was not used. The presence or absence of voids and the area ratio in the obtained shock absorbing member are shown in Table 3-2.

The aforementioned "Impact Fracture Test (1)" was carried out for the shock absorbing members of Examples 29 to 43 and Comparative Example 6. The results are shown in Table 3-2.

TABLE 3-1

| | First sheet-like member | | Bonding material | | Bonding conditions | | |
| --- | --- | --- | --- | --- | --- | --- | --- |
| | Thickness (mm) | Rz of surface to be bonded (μm) | Number of sheets | Kind of material | Shape of hole | Temperature (° C.) | Time (h) | Pressure (kPa) |
| Example 29 | 1 | 2 | 10 | Al | 4 mmφ × 25 | 1000 | 2 | 35 |
| Example 30 | 1 | 2 | 10 | Al | 8 mmφ × 25 | 1000 | 2 | 35 |
| Example 31 | 1 | 2 | 10 | Al | 12 mmφ × 25 | 1000 | 2 | 35 |
| Example 32 | 1 | 2 | 10 | Al | 4 mm□ × 25 | 1000 | 2 | 35 |
| Example 33 | 0.1 | 2 | 100 | Al | 8 mmφ × 25 | 1000 | 2 | 35 |
| Example 34 | 5 | 2 | 2 | Al | 8 mmφ × 25 | 1000 | 2 | 35 |
| Example 35 | 1 | 2 | 10 | Cu | 8 mmφ × 25 | 1500 | 2 | 35 |
| Example 36 | 1 | 2 | 10 | Ag | 8 mmφ × 25 | 1400 | 2 | 35 |
| Example 37 | 1 | 2 | 10 | Au | 8 mmφ × 25 | 1300 | 2 | 35 |
| Example 38 | 1 | 2 | 10 | Al | 3 mmφ × 25 | 1000 | 2 | 35 |
| Example 39 | 1 | 2 | 10 | Al | 13 mmφ × 25 | 1000 | 2 | 35 |
| Example 40 | 1 | 2 | 10 | Al | nothing | 1000 | 2 | 35 |
| Comparative Example 6 | 1 | 2 | 10 | — | — | 1000 | 2 | 35 |
| Example 41 | 1 | 2 | 10 | Cu | nothing | 1500 | 2 | 35 |
| Example 42 | 1 | 2 | 10 | Ag | nothing | 1400 | 2 | 35 |
| Example 43 | 1 | 2 | 10 | Au | nothing | 1300 | 2 | 35 |

TABLE 3-2

| | Presence or absence of voids | Area ratio of contact region (%) | Damaged volume (cm$^3$) | Average particle size of fragments (mm) |
| --- | --- | --- | --- | --- |
| Example 29 | present | 6 | 1.8 | 1.8 |
| Example 30 | present | 24 | 1.5 | 1.6 |
| Example 31 | present | 55 | 1.1 | 1.3 |
| Example 32 | present | 8 | 1.7 | 1.7 |
| Example 33 | present | 24 | 0.9 | 1.1 |
| Example 34 | present | 24 | 1.9 | 2 |
| Example 35 | present | 24 | 1.7 | 1.6 |
| Example 36 | present | 24 | 1.9 | 1.7 |
| Example 37 | present | 24 | 1.7 | 1.5 |
| Example 38 | present | 4 | 2 | 2.1 |
| Example 39 | present | 66 | 1 | 1.6 |
| Example 40 | absent | 0 | 2 | 2.1 |
| Comparative Example 6 | — | — | unmeasurable | unmeasurable |
| Example 41 | absent | 0 | 2.4 | 2.4 |
| Example 42 | absent | 0 | 2.5 | 2.4 |
| Example 43 | absent | 0 | 2.2 | 2.6 |

(Evaluation)

In the case of the shock absorbing member of Comparative Example 6, cracks were generated radially on the surface with which the projectile collided. On the other hand, in the cases of the shock absorbing members of Examples 29 to 39 in which a plurality of voids were formed at the interface between the first sheet-like member and the bonding layer, radial cracks were hardly observed. Moreover, as the area ratio of the noncontact region was larger, the damaged volume at the cone-like damaged part was smaller, the average diameter of generated fragments were smaller (Examples 29 to 32, and Example 40). Moreover, as shown in Table 3-2, in Example 38 in which a plurality of voids were formed at the interface between the first sheet-like member and the bonding layer, since the area ratio of the noncontact region was as small as 4%, the damaged volume and the average particle size of fragments were larger than those of Examples 29 to 32. However, since the damaged volume and the average particle size of fragments of Example 38 is smaller than the damaged volume and the average particle size of fragments of the shock absorbing member of Example 40, there is no problem at all practically. On the other hand, in Example 39, the damaged volume became smaller, however the damage at the foreground tended to be larger than those of Examples 29 to 32, and Example 38, the average diameter of fragments tended to be a little larger than those of Examples 29 to 32, and Example 38. However, even the shock absorbing member of Example 39 has no problem practically judging from the damaged volume and the average particle size of fragments. In addition, as for the shock absorbing member of Comparative Example 6 (without using a bonding material), the foreground of the first sheet-like members were smashed up, anomalous fracture behaviors were seen, and therefore the damaged volume and the average particle size of fragments could not be measured. Compared with Example 29, the lamination number of Example 33 is ten hold, and the lamination number of Example 34 is ⅕ times, however judging from the damaged volumes and the average particle sizes of fragments of Example 33 and 34, it is understood that both are practicable. Moreover, the kind of the bonding material of shock absorbing members of Examples 35, 36, and 37 were Cu, Ag, and Au, respectively, however all the shock absorbing members were practicable in addition to the case where the kind of the bonding material was Al.

Example 44

A laminated body was obtained by laminating 10 sheets of the first sheet-like members having a thickness of 10 mm and a maximum height of roughness Rz of the bonded surface of 2.0 μm with aluminum films having a thickness of 10 μm (purity: 99%) in which 25 holes each having a diameter of 4 mmφ were made interposed therebetween. The first sheet-like members were bonded by heating the obtained laminated body in a vacuum at 1000° C. for 2 hours while pressurizing at a pressure of 35 kPa in the lamination direction to obtain a ceramic bonded body having a thickness of 100 mm. The obtained ceramic bonded body was used as a shock absorbing member (Example 44). A plurality of voids were formed at the interface between the first sheet-like member and the bonding layer of the obtained shock absorbing member. Moreover, an area ratio of the noncontact region was 6%.

Examples 45 to 58

Shock absorbing members (Examples 45 to 58) were obtained in the same manner as in the aforementioned Example 44 except that the first sheet-like members and the bonding materials shown in Table 4-1 were used and bonding was carried out under the bonding conditions shown in Table 4-1. The presence or absence of voids and area ratios in the obtained shock absorbing members are shown in Table 4-2.

Comparative Example 7

A shock absorbing member (Comparative Example 7) being a ceramic bonded body was obtained in the same manner as in the aforementioned Example 44. The presence or absence and an area ratio of the noncontact region of the obtained shock absorbing member are shown in Table 4-2.

(Impact Fracture Test (2))

The aforementioned "Impact Fracture Test (2)" was carried out for the shock absorbing members of Examples 44 to 58 and Comparative Example 7. In addition, the projectile was not penetrated in any of the shock absorbing members (Examples 44 to 58, Comparative Example 7), and therefore "the extent of cracks" and "the intervals of cracks" were evaluated by visual observation of the surface with which the projectile collided. The results are shown in Table 4-2.

TABLE 4-1

| | First sheet-like member | | | Bonding material | | Bonding conditions | | |
|---|---|---|---|---|---|---|---|---|
| | Thickness (mm) | Rz of surface to be bonded (μm) | Number of sheets | Kind of material | Shape of hole | Temperature (° C.) | Time (h) | Pressure (kPa) |
| Example 44 | 10 | 2 | 10 | Al | 4 mmφ × 25 | 1000 | 2 | 35 |
| Example 45 | 10 | 2 | 10 | Al | 8 mmφ × 25 | 1000 | 2 | 35 |
| Example 46 | 10 | 2 | 10 | Al | 12 mmφ × 25 | 1000 | 2 | 35 |
| Example 47 | 10 | 2 | 10 | Al | 4 mm□ × 25 | 1000 | 2 | 35 |
| Example 48 | 5 | 2 | 20 | Al | 8 mmφ × 25 | 1000 | 2 | 35 |
| Example 49 | 50 | 2 | 2 | Al | 8 mmφ × 25 | 1000 | 2 | 35 |
| Example 50 | 10 | 2 | 10 | Cu | 8 mmφ × 25 | 1500 | 2 | 35 |
| Example 51 | 10 | 2 | 10 | Ag | 8 mmφ × 25 | 1400 | 2 | 35 |
| Example 52 | 10 | 2 | 10 | Au | 8 mmφ × 25 | 1300 | 2 | 35 |
| Example 53 | 10 | 2 | 10 | Al | 3 mmφ × 25 | 1000 | 2 | 35 |
| Example 54 | 10 | 2 | 10 | Al | 13 mmφ × 25 | 1000 | 2 | 35 |
| Example 55 | 10 | 2 | 10 | Al | nothing | 1000 | 2 | 35 |
| Comparative Example 7 | 10 | 2 | 10 | — | — | 1000 | 2 | 35 |
| Example 56 | 10 | 2 | 10 | Cu | nothing | 1500 | 2 | 35 |
| Example 57 | 10 | 2 | 10 | Ag | nothing | 1400 | 2 | 35 |
| Example 58 | 10 | 2 | 10 | Au | nothing | 1300 | 2 | 35 |

TABLE 4-2

| | Presence or absence of voids | Area ratio of contact region (%) | Extent of cracks | Intervals of cracks |
|---|---|---|---|---|
| Example 44 | present | 6 | small | wide |
| Example 45 | present | 24 | small | wide |
| Example 46 | present | 55 | small | wide |
| Example 47 | present | 8 | small | wide |
| Example 48 | present | 24 | small | wide |
| Example 49 | present | 24 | somewhat large | somewhat narrow |
| Example 50 | present | 24 | small | wide |
| Example 51 | present | 24 | small | wide |
| Example 52 | present | 24 | small | wide |
| Example 53 | present | 4 | somewhat large | somewhat narrow |
| Example 54 | present | 66 | large somewhat large | narrow somewhat narrow |
| Example 55 | absent | 0 | large | narrow |
| Comparative Example 7 | absent | 100 | very large | very narrow |
| Example 56 | absent | 0 | large | narrow |
| Example 57 | absent | 0 | large | narrow |
| Example 58 | absent | 0 | large | narrow |

(Evaluation)

As shown in Table 4-2, in the case of the shock absorbing members of Examples 55 and Comparative Example 7, a large number of cracks were generated and the intervals of the cracks were narrow. On the other hand, as for the shock absorbing members of Examples 44 to 48, the number of generated cracks was small and the intervals tended to be wide in the case where an area ratio of the noncontact region was 6% or more and 55% or less, while the extent of cracks were a little bit larger and the intervals were a little bit narrower in the case where an area ratio of the noncontact region was 4% in Example 53, but the shock absorbing member of Example 53 was practically usable. However, in the case where an area ratio of the noncontact region was 0% in Example 55, the number of generated cracks were large and the intervals of the cracks tended to be narrow. Moreover, in the case where an area ratio of the noncontact region was 66% in Example 54, the extent of cracks were a little bit larger and the intervals were a little bit narrower, but the shock absorbing member of Example 54 was practically usable. However, in the case where an area ratio of the noncontact region was 100% in Comparative Example 7, the forefront of the first sheet-like members were smashed up, anomalous fracture behaviors were seen, the number of generated cracks were very large, and the intervals were very narrow. When copper, silver, and gold were used respectively as a bonding material and the impact fracture test (2) was carried out for the samples having an area ratio of the noncontact region of 24% in Examples 50 to 52, the number of generated cracks were small and the intervals tended to be wide in the same way as in the case where aluminum was used as a bonding material. When copper, silver, and gold were used respectively as a bonding material and the impact fracture test (2) was carried out for the samples having an area ratio of the noncontact region of 0% in Examples 56 to 58, the number of generated cracks were large and the intervals thereof tended to be narrow.

Example 59

A laminated body was obtained by laminating 10 sheets of the first sheet-like members having a thickness of 1 mm and a maximum height of roughness Rz of the bonded surface of 2.0 μm with aluminum films (purity: 99%) having a thickness of 10 μm interposed therebetween. The first sheet-like members were bonded by heating the obtained laminated body in a vacuum at 1000° C. for 2 hours without being pressurized in the lamination direction to obtain a ceramic bonded body having a thickness of 10 mm. The obtained ceramic bonded body was used as a shock absorbing member (Example 59). A plurality of voids were formed at the interface between the first sheet-like member and the bonding layer of the obtained shock absorbing member. Moreover, an area ratio of the noncontact region was 40%.

Examples 60 to 65

Shock absorbing members (Examples 60 to 65) were obtained in the same manner as in the aforementioned Example 59 except that the first sheet-like members and the bonding material shown in Table 5-1 were used and bonding was carried out under the bonding conditions shown in Table 5-1. The presence or absence of voids and area ratios in the obtained shock absorbing members are shown in Table 5-2.

The aforementioned "Impact Fracture Test (1)" was carried out for the shock absorbing members of Examples 59 to 65. The results are shown in Table 5-2.

TABLE 5-1

| | First sheet-like member | | | Kind | Bonding conditions | | |
|---|---|---|---|---|---|---|---|
| | Thickness (mm) | Rz of surface to be bonded (μm) | Number of sheets | of bonding material | Temperature (° C.) | Time (h) | Pressure (kPa) |
| Example 59 | 1 | 2 | 10 | Al | 1000 | 2 | 0 |
| Example 60 | 1 | 2 | 10 | Al | 1000 | 2 | 15 |
| Example 61 | 1 | 5 | 10 | Al | 1000 | 2 | 20 |
| Example 62 | 1 | 6 | 10 | Al | 1000 | 2 | 35 |
| Example 63 | 1 | 2 | 10 | Al | 1000 | 15 | 20 |
| Example 64 | 1 | 2 | 10 | Al | 1000 | 50 | 20 |
| Example 65 | 1 | 2 | 10 | Al | 1000 | 2 | 35 |

TABLE 5-2

| | Presence or absence of voids | Area ratio of contact region (%) | Damaged volume ($cm^3$) | Average particle size of fragments (mm) |
|---|---|---|---|---|
| Example 59 | present | 40 | 1.3 | 1.3 |
| Example 60 | present | 15 | 1.8 | 1.9 |
| Example 61 | present | 30 | 1.5 | 1.4 |
| Example 62 | present | 35 | 1.4 | 1.3 |
| Example 63 | present | 35 | 1.4 | 1.3 |
| Example 64 | present | 45 | 1.2 | 1.1 |
| Example 65 | absent | 0 | 2 | 2.1 |

(Evaluation)

In the case of the shock absorbing member of Example 65, cracks were generated radially on the surface with which the projectile collided. On the other hand, in the cases of the shock absorbing members of Examples 59 to 62 in which a plurality of voids were formed at the interface between the first sheet-like member and the bonding layer, radial cracks were hardly observed. In addition, as shown in Tables 5-1 and 5-2, when Example 59 and Example 60 are compared, it is understood that the area ratio of the noncontact region increases by reducing the loaded pressure at the time of bonding. Moreover, when Example 61, Example 62, and Example 65 are compared, it is understood that the area ratio of the noncontact region increases by increasing the maximum height of roughness Rz of the bonded surface of the first sheet-like member. Furthermore, when Example 63, Example 64, and Example 65 are compared, it is understood that the area ratio of the noncontact region increases by making the heating time longer.

Example 66

A shock absorbing member having a layer constitution as shown in FIG. 1B (Example 66) was prepared by laminating: a sheet (thickness 10 mm) obtained by laminating the ceramic bonded body (thickness 10 mm) prepared in Example 30 and a sheet comprising an aramid based fiber, and integrating the resultant laminated body with an epoxy resin; and a metal plate made of aluminum (thickness 10 mm) in this order.

(Evaluation)

The aforementioned "Impact Fracture Test (1)" was carried out for the shock absorbing members of Example 66 and Comparative Example 5. In consequence, the projectile was destroyed on surfaces of both shock absorbing members. However, the back sides (a metal plate made of aluminum) of the shock absorbing members were in different situations. In the case of the shock absorbing member of Comparative Example 5, a hole having a diameter of about 2 mm was formed. On the other hand, in the case of the shock absorbing member of Example 66, no appearance changes were observed on the metal plate made of alumina.

Example 67

Laminated were 4 sheets of the first sheet-like members each having a thickness of 0.5 mm and a maximum height of roughness Rz of the bonded surface of 1.7 μm with aluminum films (purity: 99%) each having a thickness of 10 μm interposed therebetween. Laminated were further 5 sheets of the first sheet-like members each having a thickness of 1 mm and a maximum height of roughness of the bonded surface of 1.7 μm with aluminum films (purity: 99%) each having a thickness of 10 μm in which 25 holes each having a diameter of 8 mmϕ are present interposed therebetween to obtain a laminated body. The first sheet-like members were bonded by heating the obtained laminated body in a vacuum at 1000° C. for 2 hours while pressurizing at a pressure of 35 kPa in the lamination direction to obtain a ceramic bonded body having a thickness of 7 mm. A shock absorbing member (Example 67) having a layer constitution as shown in FIG. 3 was prepared by laminating: a sheet (thickness 10 mm) obtained by laminating the obtained ceramic bonded body and a sheet comprising an aramid based fiber and integrating the resultant laminated body with an epoxy resin; and a metal plate made of aluminum (thickness 10 mm) in this order. A plurality of voids were formed at the interface between the first sheet-like member and the bonding layer of the obtained shock absorbing member. Moreover, an area ratio of the noncontact region was 24%.

(Evaluation)

The aforementioned "Impact Fracture Test (1)" was carried out for the shock absorbing member of Example 67. In consequence, the projectile was destroyed on the surface of the shock absorbing member and no appearance changes were observed on the metal plate made of aluminum.

From the above results, it turned out that a higher shock absorptivity was exhibited by using a ceramic bonded body in which a plurality of voids were formed at the interface between the first sheet-like member and the bonding layer, the ceramic bonded body obtained by bonding larger lamination number of the first sheet-like members having a thinner thickness.

INDUSTRIAL APPLICABILITY

A shock absorbing member of the present invention exhibits a high shock absorptivity equal to or higher than the conventional products, enables to make the thickness thereof thin and therefore is lightweight compared with the conventional products, and is preferable as a formation material for protective equipment. Examples of utilizing the shock absorbing member of the present invention include various products capable of alleviating shock that could possibly affect a human body, vehicles, or the like from various high-speed projectile for sure and in such a form that the load to human body, vehicles, or the like is suppressed, and a protective member for a robot arm or the like that is operating at a high speed.

REFERENCE SIGNS LIST 5, 6, 7, 8, 10, 20 and 35: First sheet-like member
5a, 5b and 100: Surface to be bonded
15 and 25: Ceramic bonded body
30: Third sheet-like member
40: Fourth sheet-like member
50, 55 and 60: Shock absorbing member
65, 66, 67 and 68: Bonding layer
70: Receiving layer
80, 82 and 84: Void
90: Noncontact region
95: Contact region

The invention claimed is:

1. A shock absorbing member comprising a ceramic bonded body comprising:
   a plurality of first sheet-like members each comprising a ceramic that comprises boron carbide in an amount of 60 mass % or more, and each having a thickness of 0.1 to 50 mm; and
   a bonding layer arranged between the first sheet-like members adjacent to each other, wherein the bonding layer bonds surfaces of the first sheet-like members facing each other and being adjacent to each other,
   wherein the bonding layer comprises a bonding material comprising at least one metal selected from the group consisting of aluminum, copper, silver, and gold,
   the adjacent first sheet-like members bonded to each other with the bonding layer are integrated,
   from 2 to 1000 sheets of the first sheet-like members are laminated in a thickness direction of the sheet-like members,
   the ceramic bonded body has a flexural strength of 100 MPa or higher when measured by a four-point bending method, and
   a plurality of voids are formed in the bonding layer at an interface between the first sheet-like member and the bonding layer.

2. The shock absorbing member according to claim 1, wherein the thickness of the first sheet-like members increases in a stepwise fashion from a surface side of the ceramic bonded body toward a back side-thereof.

3. The shock absorbing member according to claim 1,
   wherein the ceramic bonded body further comprises one or more second sheet-like members, which comprises silicon carbide, mullite, or alumina, and
   wherein the second sheet-like member is laminated on the first sheet-like member through the bonding layer.

4. The shock absorbing member according to claim 1, wherein the bonding layer has a thickness from 0.001 to 1 mm.

5. The shock absorbing member according to claim 1, further comprising a receiving layer arranged on a back side of the ceramic bonded body, the receiving layer receiving fragments generated when the ceramic bonded body is damaged.

6. The shock absorbing member according to claim 1,
   wherein the plurality of the first sheet-like members are laminated in a thickness direction of the first sheet-like members when three or more of the first sheet-like members are laminated, and
   the shock absorbing member prevents damages from a shock of collision of a high-speed projectile collided with the shock absorbing member.

7. The shock absorbing member according to claim 1,
   wherein the surface of the first sheet-like member bonded with the adjacent and facing first sheet-like member through the bonding layer is not contacting the bonding layer at a noncontact region, and
   an area ratio of the noncontact region accounts for from 6 to 60% of each surface of the first sheet-like member bonded with the adjacent and facing first sheet-like member through the bonding layer.

8. The shock absorbing member according to claim 1, wherein the bonding material comprises aluminum.

9. The shock absorbing member according to claim 1, wherein the bonding material comprises copper.

* * * * *